United States Patent
Borges et al.

(10) Patent No.: US 11,451,966 B2
(45) Date of Patent: Sep. 20, 2022

(54) WIRELESS ACCESS PROTOCOL WITH COLLABORATIVE SPECTRUM MONITORING

(71) Applicant: Apple Inc., Cupertino, CA (US)

(72) Inventors: Daniel R. Borges, San Francisco, CA (US); Joseph Hakim, Soquel, CA (US); Sriram Hariharan, San Jose, CA (US); Yoel Boger, Shoham (IL); Xiaowen Wang, Cupertino, CA (US); Yaniv Dvory, Kfar Saba (IL)

(73) Assignee: Apple Inc., Cupertino, CA (US)

( * ) Notice: Subject to any disclaimer, the term of this patent is extended or adjusted under 35 U.S.C. 154(b) by 133 days.

(21) Appl. No.: 16/809,432

(22) Filed: Mar. 4, 2020

(65) Prior Publication Data
US 2020/0288326 A1    Sep. 10, 2020

Related U.S. Application Data

(60) Provisional application No. 62/813,520, filed on Mar. 4, 2019.

(51) Int. Cl.
| | |
|---|---|
| *H04W 16/14* | (2009.01) |
| *H04W 88/06* | (2009.01) |
| *H04W 84/12* | (2009.01) |
| *H04W 24/10* | (2009.01) |
| *H04W 88/08* | (2009.01) |

(Continued)

(52) U.S. Cl.
CPC .......... *H04W 16/14* (2013.01); *H04B 17/24* (2015.01); *H04W 16/02* (2013.01); *H04W 24/10* (2013.01); *H04W 72/082* (2013.01); *H04W 84/12* (2013.01); *H04W 88/06* (2013.01); *H04W 88/08* (2013.01)

(58) Field of Classification Search
CPC ..... H04W 16/14; H04W 16/02; H04W 24/10; H04W 72/082; H04B 17/24
See application file for complete search history.

(56) References Cited

U.S. PATENT DOCUMENTS

| | | | | |
|---|---|---|---|---|
| 2002/0188723 | A1* | 12/2002 | Choi | H04W 36/06 709/225 |
| 2006/0239225 | A1* | 10/2006 | Cho | H04W 72/02 370/329 |

(Continued)

*Primary Examiner* — Mohammad S Anwar
(74) *Attorney, Agent, or Firm* — Dickinson Wright RLLP

(57) ABSTRACT

This application relates to electronic devices configured to connect to a wireless local area network and communicate using a trigger-based access mechanism. An access point is configured to manage the wireless local area network. The access point includes a processing subsystem configured to select a channel associated with a communications medium for communicating with the set of electronic devices. The processing subsystem is also configured to monitor the channel to detect interference from radio frequency sources not connected to the wireless local area network, receive channel information for at least one additional channel associated with the communications medium from the electronic devices, and configure an interface circuit of the access point to communicate with the set of electronic devices on a new channel based, at least in part, on the channel information. Each electronic device can be configured to collect the channel information and transmit the channel information to the access point for analysis.

20 Claims, 19 Drawing Sheets

(51) Int. Cl.
    *H04W 72/08*     (2009.01)
    *H04B 17/24*     (2015.01)
    *H04W 16/02*     (2009.01)

(56) References Cited

U.S. PATENT DOCUMENTS

| | | | |
|---|---|---|---|
| 2007/0054690 A1* | 3/2007 | Wu | H04W 52/10 |
| | | | 455/522 |
| 2008/0273495 A1* | 11/2008 | Becker | H04W 36/0088 |
| | | | 370/331 |
| 2012/0307711 A1* | 12/2012 | Yoon | H04B 7/15542 |
| | | | 370/315 |
| 2013/0322376 A1* | 12/2013 | Marinier | H04W 72/06 |
| | | | 370/329 |
| 2015/0282211 A1 | 10/2015 | Zhang et al. | |
| 2016/0100408 A1 | 4/2016 | Hedayat | |
| 2016/0345349 A1 | 11/2016 | Ferdowsi et al. | |
| 2016/0374086 A1 | 12/2016 | Gupta et al. | |
| 2017/0339680 A1 | 11/2017 | Jia et al. | |
| 2018/0014165 A1 | 1/2018 | Li et al. | |
| 2018/0014325 A1 | 1/2018 | Dvory et al. | |
| 2018/0255422 A1 | 9/2018 | Montemurro et al. | |
| 2018/0302930 A1 | 10/2018 | Wang et al. | |

\* cited by examiner

WIRELESS ACCESS PROTOCOL WITH COLLABORATIVE SPECTRUM MONITORING

CROSS-REFERENCE TO RELATED APPLICATIONS

The present application claims the benefit of U.S. Provisional Application No. 62/813,520, entitled "WIRELESS ACCESS PROTOCOL WITH COLLABORATIVE SPECTRUM MONITORING," filed Mar. 4, 2019, the content of which is incorporated herein by reference in its entirety for all purposes.

FIELD

The described embodiments relate, generally, to wireless communications among stations in a wireless local area network (WLAN), including electronic devices and access points, and techniques for providing low latency wireless communications in a real-time environment.

BACKGROUND

Many wireless local area networks (WLANs), such as those based on a communication protocol that is compatible with a set of Institute of Electrical and Electronics Engineers (IEEE) 802.11 standards, also referred to as 'Wi-Fi', involve contention-based distributed access systems. Usually, the WLANs are contention based because they typically utilize unlicensed frequency bands or spectra, which are unpredictable and are often subject to interference. The unpredictability of the interference can make coordination across multiple electronic devices, also referred to as 'stations' (STAs), challenging (especially for an unmanaged WLAN), and can result in failure of a contention-free period (CFP).

Legacy Wi-Fi can rely on contention-based multi-user transmission in the uplink referred to as Carrier Sense Multiple Access, Collision Avoidance (CSMA/CA). Each station listens to one or more communication channels to determine whether the communications medium is busy. If the communications medium is idle, then a station can attempt to transmit data to another station during a period divided into a number of backoff slots. Each station selects a random backoff slot within a contention window, as embodied by a backoff timer, and can transmit during the selected backoff slot if the communications medium remains idle until the expiration of the backoff timer. If another station transmits on the communications medium before the backoff timer has expired, then the station resets the backoff timer and waits until the next frame to re-attempt transmission over the communications medium. However, if the backoff timer expires before another station attempts to transmit over the communications medium, the station will attempt transmission over the communications medium. However, attempting the transmission does not ensure that another station randomly selected the same backoff slot to attempt to transmit over the communications medium, thereby causing a collision to occur. Failure of the station to receive an acknowledgment frame could indicate that a collision likely occurred, and the station will attempt to retry transmission after doubling the size of the contention window to decrease the probability of another collision during the next transmission opportunity.

The contention-based access mechanism for legacy Wi-Fi, described above, leads to unbounded latency for transmission of data packets, where the expected latency is correlated with the number of stations transmitting over the communications medium. Large number of stations attempting to transmit on the same communication channel can result in a high probability of collisions, which can quickly lead to latencies in the hundreds of milliseconds (msecs). While these latencies are tolerable for some applications, such as requesting a web page on a device, latencies of hundreds of msecs are intolerable for real-time applications such as audio streaming, virtual reality, and gaming.

Contention-free multi-user transmission in uplink has been proposed for inclusion in the IEEE 802.11ax standard. This approach can dramatically change how an electronic device accesses the communications medium. In particular, an electronic device can transmit without contending for the communications medium. Instead, a primary station (e.g., an access point) controls access to the communications medium for the stations connected to the WLAN by granting transmission opportunities to each individual station using a trigger frame (which is sometimes referred to as 'trigger-based access' or 'trigger-based channel access,' e.g., uplink multi-user transmission). In principle, the use of trigger-based access and multi-user transmission can significantly reduce contention for access to the communications medium by the electronic devices in the WLAN. Consequently, trigger-based access is expected to result in improved communication performance. However, this contention-free access mechanism does little to alleviate contention issues with multiple WLANs attempting to communicate over the same communications medium (e.g., where multiple access points in close proximity implement different WLANs on the same channels of the communications medium).

Furthermore, trigger-based access and multi-user transmission can significantly increase energy consumption of the electronic devices in the WLAN. In particular, for N electronic devices sharing a channel, the average data bandwidth can be reduced by a factor of N and, therefore, the energy required to transmit the data can be increased by a factor of N. Moreover, the access overhead in the WLAN typically increases with trigger-based access and multi-user transmission. Furthermore, this approach for allocating shared resources can be inefficient (including wasted or unused resource units and, more generally, suboptimal channel utilization) and inflexible (because the electronic devices can need to transmit over the same duration time period using identical data rates). In addition, trigger-based access and multi-user transmission is not backwards compatible with existing or legacy electronic devices.

SUMMARY

Some embodiments are described that relate to an access point that controls access to a communications medium for a set of electronic devices connected to a WLAN. In particular, during operation, an interface circuit in the access point can transmit a trigger frame including information specifying an ordered list of electronic devices that are allowed to transmit data via a communications medium during a contention-free period. Subsequently, the interface circuit can sequentially receive one or more frames from the ordered list of electronic devices via the communications medium. A processing subsystem in the access point can manage the WLAN, controlling connections of electronic devices to the WLAN and selecting optimal channels for communications based on monitoring activities that assess traffic on the channels of the communications medium.

In some embodiments, an access point is disclosed that manages the WLAN. The access point includes one or more nodes configured to communicatively couple to an antenna. The access point further includes an interface circuit communicatively coupled to the one or more nodes and configured to communicate with a set of electronic devices in the WLAN. The access point further includes a processing subsystem communicatively coupled to the interface circuit and configured to cause the access point to: select a channel associated with a communications medium for communicating with the set of electronic devices, monitor the channel to detect interference from radio frequency (RF) sources not connected to the WLAN, receive channel information for at least one additional channel associated with the communications medium from one or more electronic devices in the set of electronic devices, and configure the interface circuit to communicate with the set of electronic devices on a new channel of the at least one additional channel.

In some embodiments, the processing subsystem is further configured to cause the access point to transmit a wireless signal to a particular electronic device in the set of electronic devices. The wireless signal causes the particular electronic device to adjust a transmitter power of a radio used by the particular electronic device to communicate with the access point. The particular electronic device reduces the transmitter power to reduce interference with other stations connected to one or more additional WLANs.

In some embodiments, each electronic device in the one or more electronic devices is configured to collect the channel information during a period of time subsequent to an end of a first contention-free period and prior to a start of a second contention-free period. The first contention-free period and the second contention-free periods are defined by the access point and associated with a trigger-based access mechanism included in a wireless access protocol.

In some embodiments, the communications medium comprises a number of channels in a 5 GHz radio frequency spectrum, each channel in the number of channels having a center frequency between 5.170 GHz and 5.835 GHz.

In some embodiments, the channel information comprises a signal metric for each channel in the at least one additional channel. The signal metric can be measured by a particular electronic device in the one or more electronic devices. The new channel can be selected based on a comparison of the signal metric for the new channel with a corresponding signal metric for the channel. In some embodiments, the signal metric for a particular channel is weighted based on whether the particular channel is associated with a center frequency in a range of 5.250 GHz to 5.710 GHz.

In some embodiments, the interface circuit is configured to transmit a wireless signal to the set of electronic devices that causes the electronic devices to configure a radio to operate on the new channel. In some embodiments, the wireless signal is transmitted via the WLAN. In other embodiments, the wireless signal is transmitted via a wireless personal area network.

In some embodiments, an electronic device is disclosed that includes one or more nodes configured to communicatively couple to an antenna. The electronic device also includes an interface circuit communicatively coupled to the one or more nodes and configured to communicate with an access point over a channel of a communications medium associated with WLAN. The electronic device further includes a processing subsystem communicatively coupled to the interface circuit and configured to cause the electronic device to: receive a request from the access point to collect channel information for at least one additional channel associated with the communications medium, measure a signal metric associated with each additional channel in the at least one additional channel, populate the signal metric for each additional channel in the at least one additional channel into a data structure to generate the channel information, and transmit the channel information to the access point.

In some embodiments, the processing subsystem of the electronic device is further configured to: receive information that identifies a new channel in the at least one additional channel, and configure the interface circuit to communicate with the access point over the new channel.

In some embodiments, the processing subsystem is further configured to: receive a request from the access point to reduce a transmitter power of the electronic device, and configure the interface circuit to reduce a power of wireless signals transmitted via the antenna.

In some embodiments, the interface circuit is configured to cause the electronic device to: receive a trigger frame that includes information specifying an ordered list of electronic devices in a set of electronic devices that are allowed to transmit data via the communications medium during a contention-free period, and transmit a frame at a temporal position in a sequence of frames based on the ordered list of electronic devices.

In some embodiments, a method for managing a WLAN is described. The method can be performed, at least in part, by the processing subsystem of an access point. The method includes the steps of: monitoring a portion of a radio frequency spectrum to detect a power associated with one or more channels associated with the WLAN while the one or more channels are inactive; selecting an optimum channel within the radio frequency spectrum utilized to communicate with at least one electronic device connected to the WLAN; and configuring an interface circuit of the access point to communicate with the at least one electronic device via the optimum channel. The method further includes the steps of selecting a second channel in the radio frequency based, at least in part, on channel information collected by one or more electronic devices connected to the WLAN, and re-configuring the interface circuit of the access point to communicate with the at least one electronic device via the second channel.

Other aspects and advantages of the embodiments described above will become apparent from the following detailed description, taken in conjunction with the accompanying drawings, which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that can be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
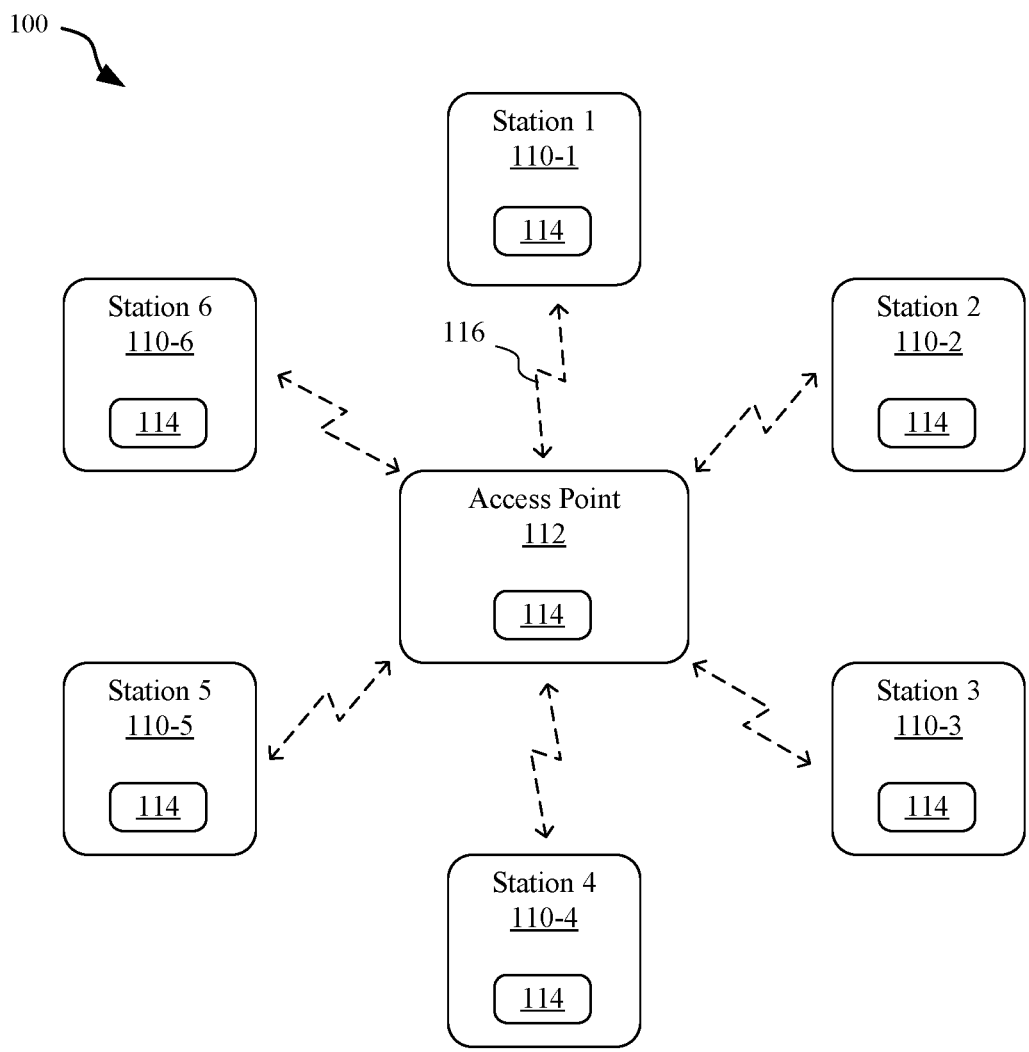
FIG. 1 is a block diagram illustrating an example of electronic devices communicating wirelessly, in accordance with some embodiments.

In various embodiments, stations connected to a WLAN, including electronic devices and/or access points, are configured to communicate via a communications medium using a trigger-based access mechanism. An access point is configured to define a contention-free period associated with the communications medium for transmitting data between stations. During the contention-free period, the access point allocates transmission opportunities to each of a number of electronic devices by transmitting trigger frames to the electronic devices connected to the WLAN via the communications medium. Each trigger frame can be directed at a particular electronic device and indicates to that electronic device that the current transmission opportunity has been allocated to that electronic device to transmit data (e.g., frames) to the access point via the communications medium. A processing subsystem of the access point implements an algorithm, which can be referred to as an access mechanism, for allocating two or more transmission opportunities within a contention-free period to two or more corresponding electronic devices connected to the WLAN.

An unscheduled access mechanism is described where the access point dynamically adjusts a duration of each transmission opportunity within the contention-free period based on the traffic on the communications medium. A particular transmission opportunity is allocated to an electronic device by transmitting a trigger frame that identifies that electronic device as a first device in an ordered list of devices. The electronic device can respond to the trigger frame by transmitting one or more data frames to the access point via the communications medium. The access point can then acknowledge receipt of the one or more frames by transmitting an acknowledgment frame to the electronic device, thereby terminating the transmission opportunity. If the electronic device does not respond to a trigger frame, then the access point can determine whether the trigger frame should be re-transmitted to the electronic device. The duration of the transmission opportunity thereby varies according to a number and duration of frames transmitted via the communications medium during the transmission opportunity as well as delays between frames where the communications medium is idle. The access point, via the unscheduled access mechanism, can limit the duration of a particular transmission opportunity to ensure that a minimum number of electronic devices connected to the WLAN are allocated at least one transmission opportunity during the current contention-free period. Furthermore, once all frames associated with a given electronic device have been transmitted via the communications medium, the access point can create a new transmission opportunity by sending a trigger frame targeted to a different electronic device.

A scheduled access mechanism is described where the access point pre-defines a duration of each transmission opportunity within the contention-free period. In some cases, the contention-free period is subdivided to provide at least one transmission opportunity to each of a number of electronic devices connected to the WLAN. Consequently, each electronic device is provided with a fixed schedule of time during a contention-free period during which that electronic device can transmit data via the communications medium.

In some embodiments, the access point manages the WLAN by monitoring the radio frequency spectrum utilized by the WLAN. The access point can detect interference on the channel of the communications medium utilized by the stations communicating via the WLAN. The access point can also monitor additional channels in the radio frequency spectrum to detect a better channel than the currently selected channel and, optionally, configure the WLAN to use the better channel.

In some embodiments, the access point utilizes a collaborative spectrum monitoring technique that utilizes the electronic devices connected to the WLAN to monitor the radio frequency spectrum. Each electronic device can generate channel information that includes signal metrics associated with each channel of a subset of channels in the radio frequency spectrum. The channel information can be transmitted to the access point, which then analyzes the channel information to select an optimum channel to utilize for communications via the WLAN.

These and other embodiments are discussed below with reference to FIGS. 1-17; however, those skilled in the art will readily appreciate that the detailed description given herein with respect to these figures is for explanatory purposes only and should not be construed as limiting.

Note that the communication techniques described herein can be used during wireless communication between electronic devices in accordance with a communication protocol, such as: an IEEE 802.11 standard (also referred to as Wi-Fi). For example, the communication technique can be used with IEEE 802.11ax, which is used as an illustrative example in the discussion that follows. However, this communication technique can also be used with a wide variety of other communication protocols, and in access points and electronic devices (such as portable electronic devices or mobile devices) that can incorporate multiple different radio access technologies (RATs) to provide connections through different wireless networks that offer different services and/or capabilities In particular, an electronic device can include hardware and software to support a wireless personal area network (WPAN) according to a WPAN communication protocol, such as those standardized by the Bluetooth® Special Interest Group (in Kirkland, Wash.) and/or those developed by Apple® (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution (LTE), LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations (STAs), client devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device can include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein can be configured as multi-mode wireless communication devices that are also capable of communicating via different 3G and/or second generation (2G) RATs. In these scenarios, a multi-mode electronic device or user equipment (UE) can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) can be used herein to describe one or more consumer electronic devices that can be capable of performing procedures associated with various embodiments of the disclosure.

FIG. 1 is a block diagram 100 illustrating an example of electronic devices communicating wirelessly, in accordance with some embodiments. In particular, one or more electronic devices 110 (such as a smartphone, a laptop computer, a notebook computer, a tablet, or another such electronic device, which is sometimes referred to as a 'primary electronic device') and access point 112 communicate wirelessly in a WLAN. Thus, electronic devices 110 are associated with access point 112. For example, electronic devices 110 and access point 112 can wirelessly communicate while: detecting one another by scanning wireless channels in a communications medium such as a subset of the RF spectrum, transmitting and receiving beacons or beacon frames on wireless channels, establishing connections (for example, by transmitting connect requests), and/or transmitting and receiving packets or frames (which can include the request and/or additional information, such as data, as payloads). Note that access point 112 can provide access to a network, such as the Internet, via an Ethernet protocol, and can be a physical access point or a virtual or 'software' access point that is implemented by a host on a computer or an electronic device. In some embodiments, the access point 112 can be omitted and a primary station (e.g., a primary electronic device) can function similar to the access point 112, but without providing access via Ethernet or some other wired or wireless protocol to a separate external network such as the Internet.

As described further below with reference to FIG. 17, electronic devices 110 and access point 112 can include subsystems, such as a networking subsystem, a memory subsystem, and a processing subsystem. In addition, electronic devices 110 and access point 112 include radios 114 in the networking subsystems. More generally, electronic devices 110 and access point 112 can include (or can be included within) any electronic devices with networking subsystems that enable electronic devices 110 and access point 112 to wirelessly communicate with another electronic device via a communications medium, such as one or more channels of a radio frequency (RF) spectrum. This can include transmitting beacon frames on wireless channels to enable the electronic devices 110 to make initial contact with or to detect each other, followed by exchanging subsequent data/management frames (such as connect requests) to establish a connection, configure security options (e.g., IPSec), transmit and receive packets or frames via the connection, etc.

As depicted in FIG. 1, wireless signals 116 (represented by a jagged line) are communicated by radios 114 in electronic device 110-1 and access point 112, respectively. For example, as noted previously, electronic device 110-1 and access point 112 can exchange packets using a communication protocol in a WLAN. For example, access point 112 transmits trigger frames to the one or more electronic devices 110. In response, one or more of electronic devices 110 (which are sometimes referred to as a 'set of electronic devices') transmit one or more frames to access point 112. The trigger frame can include information specifying an ordered list of electronic devices in the one or more electronic devices 110 that are allowed to transmit over the communications medium. For example, the information specifying the ordered list of electronic devices (such as identifiers of the electronic devices in the ordered list of electronic devices) can be included in dedicated information bytes in a field following a MAC header of the trigger frame.

In response to the trigger frame, the one or more electronic devices 110 in the ordered list of electronic devices (such as electronic device 110-1) sequentially transmit one or more frames to access point 112 at temporal positions or transmission opportunities that correspond to or are based on the ordered list of electronic devices. For example, a given electronic device in the ordered list of electronic devices can transmit a frame in a sequences of one or more frames after another frame is transmitted by a preceding electronic device in the ordered list of electronic devices. Alternatively, the given electronic device can transmit a frame in the sequence of one or more frames during a time slot after an unused transmit opportunity of the preceding electronic device in the ordered list of electronic devices.

In this trigger-based channel-access technique, the given electronic device can select a data rate and a length of the frame that it transmits in response to the trigger frame. For example, the information in the trigger frame can specify a maximum frame duration, and the frame from or transmitted by the given electronic device can have a duration that is less than or equal to the maximum frame duration. Thus, the lengths and/or the data rates of two or more of the frames received from the ordered list of electronic devices can be different from each other. For example, each frame can specify data rates of 6 Mbps, 24 Mbps, or 54 Mbps depending on the amount of data that needs to be transmitted within a particular frame.

Furthermore, the information in the trigger frame can specify that each of the electronic devices in the ordered list of electronic devices responds to the trigger frame (e.g., by transmitting a frame). Therefore, access point 112 receives a frame from each of the electronic devices in the ordered list of electronic devices. In some cases, that frame can be a null frame (e.g., wherein the payload in the frame contains no data). However, in other embodiments, the electronic devices in the ordered list of electronic devices only transmit at their corresponding transmission opportunities (which are indirectly specified by the ordered list of electronic devices) if they have uplink or queued data.

After the last electronic device in the ordered list of electronic devices has transmitted a frame or been allocated a transmission opportunity, access point 112 can transmit a block acknowledgment to the ordered list of electronic devices. However, in other embodiments access point 112 transmits an acknowledgment to each of the electronic devices in the ordered list of electronic device after each of the electronic devices transmits a corresponding frame of data.

Note that access point 112 and at least some of electronic devices 110 can be compatible with an IEEE 802.11 standard that includes trigger-based channel access (such as IEEE 802.11ax). However, access point 112 and at least this subset of electronic devices 110 can also communicate with one or more legacy electronic devices that are not compatible with the IEEE 802.11 standard (e.g., that do not use multi-user trigger-based channel access). As described further below, the communication technique can also be implemented using a legacy electronic device.

In addition, note that the transmit power of the electronic devices in the ordered list of electronic devices can be proportional to a transmit bandwidth of these electronic devices (as opposed to being proportional or scaling as a number of electronic devices N in the ordered list of electronic devices).

In these ways, the communication technique can allow electronic devices 110 and access point 112 to reduce contention in the WLAN and to improve communication performance (e.g., decrease latency with regard to frame transmission). These capabilities can improve the user experience when using electronic devices 110, especially in the context of real-time applications.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique can be characterized by a variety of communication-performance metrics. For example, the communication-performance metric can include: a received signal strength (RSS), a data rate, a data rate for successful communication (which can also referred to as a throughput), a latency, an error rate (such as a retry or resend rate), a mean-square error of equalized signals relative to an equalization target, inter-symbol interference, multipath interference, a signal-to-noise ratio (SNR), a width of an eye pattern, a ratio of number of bytes successfully communicated during a time interval (such as one to ten seconds) to an estimated maximum number of bytes that can be communicated in the time interval (the latter of which can also be referred to as the capacity of a communication channel or link), and/or a ratio of an actual data rate to an estimated data rate (which can also be referred to as utilization).

Although we describe the network environment shown in FIG. 1 as an example, in alternative embodiments, different numbers and/or types of electronic devices can be present or otherwise included in the WLAN. For example, some embodiments can include more or fewer electronic devices 110 connected to the access point 112.

In some embodiments, the electronic devices 110 can be referred to as controllers. As used herein, a controller is any device that is configured as a human interface device (HID). For example, a controller can be implemented as a game pad for a gaming console, similar to an Xbox wireless controller as produced by Microsoft® Corporation (in Redmond, Wash.). As another example, a controller can be implemented as a wearable device such as a band or head-mounted device. The wearable device can be configured to track a movement or location of a part of a user's body. In some embodiments, the controller can provide HID data to the access point and receive haptic (HAP) data from the access point. The HAP data can be utilized by the controller to provide feedback to a user through a haptic feedback system such as a vibrating motor or an audio transducer.

Figure 2:
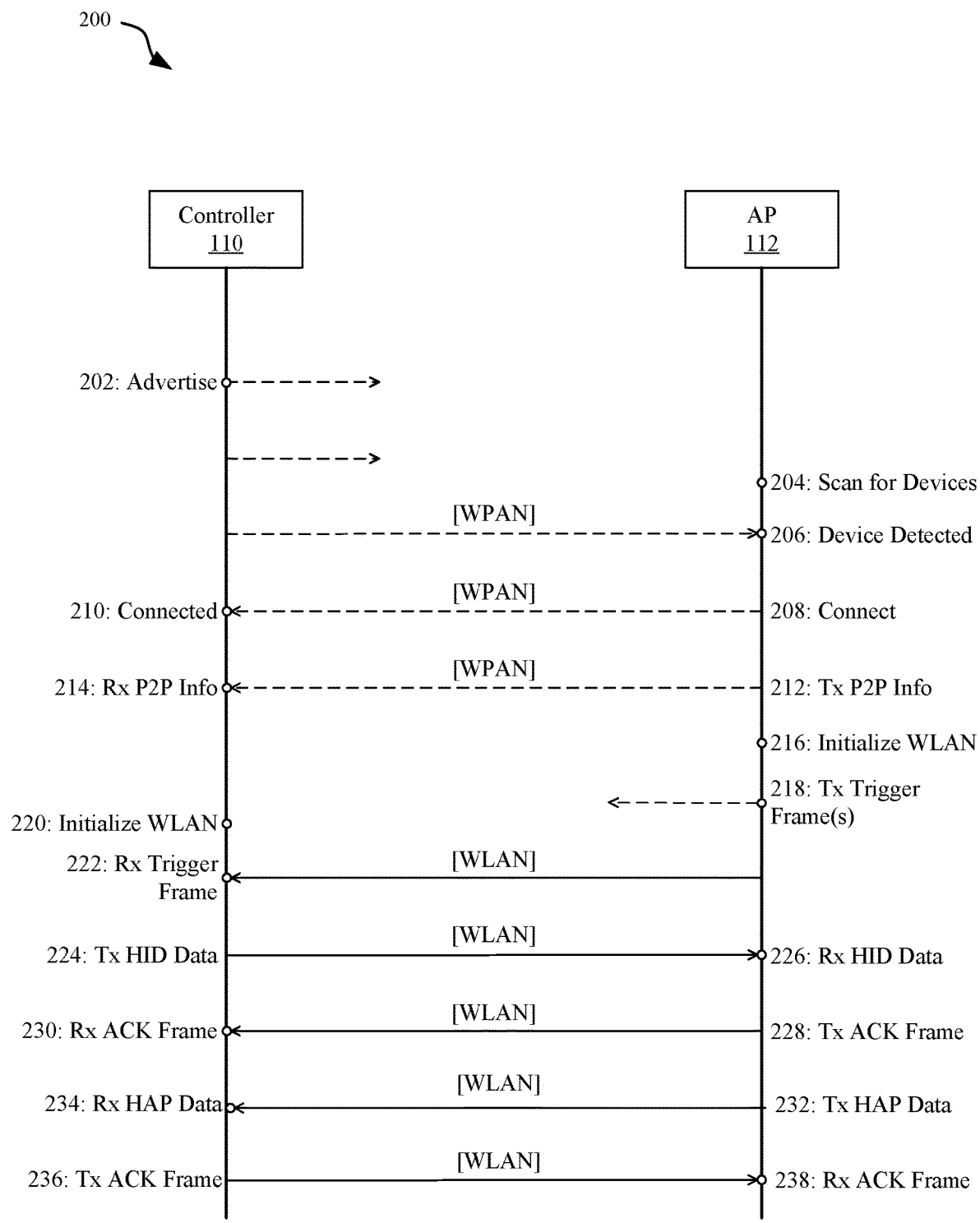
FIG. 2 illustrates a protocol for an electronic device to connect to the WLAN of FIG. 1, in accordance with some embodiments.

FIG. 2 illustrates a protocol 200 for an electronic device 110 to connect to the WLAN of FIG. 1, in accordance with some embodiments. It will be appreciated that communication via the communications medium associated with the WLAN can consume significant energy. For example, operation of the radios 114 can consume energy as data is transmitted via or received over the wireless communications medium. Therefore, it can be beneficial to reduce energy consumption by disabling the radio 114 or other signal processing circuitry in the electronic device 110 for communicating via the WLAN when the electronic device 110 is not connected to the WLAN. The electronic device 110 can be disconnected from the WLAN when the electronic device 110 is out of range of the access point 112 or when the electronic device 110 is initially powered up. Alternatively, the electronic device 110 can automatically disconnect from the WLAN when the electronic device 110 remains idle for a timeout period (e.g., when the electronic device 110 does not transmit data to the access point 112 for a specified period of time) or under other disconnection criteria, including user input explicitly requesting the electronic device 110 disconnect from the WLAN.

In some embodiments, the electronic device 110 can be connected to a WPAN that is separate and distinct from the WLAN. For example, the electronic device 110 can communicate wirelessly with the access point 112 via a Bluetooth® Low Energy (BLE) communications protocol that utilizes either the radio 114, or a separate radio, configured to communicate via communication channels within the 2.4 GHz RF spectrum. The WPAN communication protocol is designed to reduce energy consumption of the device when compared to using, e.g., a standard Wi-Fi communication protocol specified by one or more of the IEEE 802.11 standards. The WPAN communication protocol saves energy by reducing the complexity of the communication protocol, thereby reducing the data throughput transmitted over the communication channel. However, this reduced data throughput can be insufficient for certain applications that require more data throughput or lower latency than the WPAN communication protocol can provide. Therefore, the electronic device 110 can be configured to use the WPAN to communicate with the access point 112 in order to connect to the WLAN for wireless communication between devices.

As depicted in FIG. 2, the protocol 200 begins at the electronic device 110, which can also be referred to as a station, by advertising the presence of the electronic device 110 on one or more channels of a communications medium associated with a WPAN. In some embodiments, the electronic device 110 periodically transmits an advertising packet on one or more channels (e.g., three channels) in the 2.4 GHz RF spectrum. At 204, the access point 112 begins to scan for devices by listening to the one or more channels for advertising packets. It will be appreciated that, in some embodiments, the access point 112 can begin scanning for devices prior to the electronic device 110 initiating the transmission of advertising packets at 202. In such cases, the access point 112 can receive the initial advertising packet transmitted by the electronic device 110. Otherwise, as shown in FIG. 2, one or more advertising packets can not be received by the access point 112 prior to a particular advertising packet being received at 206, where the access point 112 identifies the electronic device 110 by the payload included in the advertising packet.

In some embodiments, the advertising packet includes a universally unique identifier (UUID) that identifies a WPAN interface for the electronic device 110. The UUID is unique to the electronic device 110 and is used to distinguish a particular electronic device 110 from all other electronic devices 110 transmitting advertising packets via the one or more channels associated with the WPAN. In some embodiments, the UUID is a media access control (MAC) address associated with a WPAN interface implemented by the electronic device 110. In some embodiments, the advertising packet can also include one or more advertising data structures. Each advertising data structure can include a UUID for one or more services implemented by the electronic device 110. For example, the electronic device 110 can implement a service for connecting to a WLAN that provides low latency, such that the advertising packet indicates to the access point 112 that the electronic device 110 is requesting a connection with the WLAN.

At 208, the access point 112 transmits connection data to the electronic device 110. The connection data can include any data necessary for the electronic device 110 to connect to the WPAN. At 210, the electronic device 110 receives the connection data, which is used to configure the electronic device 110 to connect to the WPAN. Subsequently, at 212, the access point 112 transmits peer-to-peer (P2P) information to the electronic device 110 via the WPAN, and, at 214, the electronic device 110 receives the P2P information.

In some embodiments, the P2P information includes information for establishing a connection with a WLAN configured to provide low latency Wi-Fi. For example, the P2P information can include a basic service set identifier (BSSID), a channel or channels associated with the WLAN, and any other parameters necessary to connect to and communicate with the access point 112 over the WLAN, such as parameters for implementing IPSec. In some embodiments, the WLAN is established utilizing one or more channels within a 5 GHz RF spectrum, which is separate and distinct from the RF spectrum utilized by the WPAN (e.g., the 2.4 GHz RF spectrum).

At 216, the access point 112 initializes the WLAN. Initialization can include configuring the radio 114 to communicate on one or more channels of the RF spectrum. Initialization can also include adding an identifier for the electronic device 110 and/or a service implemented by the electronic device 110 to a data structure stored in a memory of the access point 112. The identifier can be utilized by the access point 112 to target the electronic device 110. In some embodiments, the identifier is an association identifier (AID) that can be included in the trigger frame to allocate a transmission opportunity over the communications medium to a particular electronic device 110.

At 218, the access point 112 can begin communicating with the electronic device 110 according to a trigger-based channel-access technique over the WLAN. In some embodiments, the trigger-based channel-access technique can be referred to as a Triggered Wi-Fi Access Protocol (TWAP), described in more detail in U.S. patent application Ser. No. 15/644,495, which is incorporated herein in its entirety.

At 220, the electronic device 110 initializes the WLAN based on the P2P information received via the WPAN. Initialization can include configuring the radio 114 to communicate on one or more channels of the RF spectrum. Initialization can also include listening for the receipt of one or more trigger frames from the access point 112. It will be appreciated that one or more trigger frames can be transmitted by the access point 112 prior to initialization of the WLAN by the electronic device 110 at 220. In such cases, the access point 112 will retransmit the trigger frame until receiving a response from the electronic device 110. Alternatively, the electronic device 110 can initialize the WLAN at 220 prior to the access point transmitting a trigger frame at 218.

At 222, the electronic device 110 receives the trigger frame. In some embodiments, the trigger frame includes an identifier associated with the electronic device 110, such as the AID, which indicates that the access point 112 has allocated a transmission opportunity for the electronic device 110 to transmit data on an uplink of the WLAN. At 224, the electronic device 110 transmits one or more frames of HID data to the access point 112 via the WLAN. At 226, the access point 112 receives the one or more frames of HID data. At 228, the access point 112 transmits an acknowledgment (ACK) frame to the electronic device 110 via the WLAN to acknowledge receipt of the one or more frames of HID data, and, at 230, the electronic device 110 receives the ACK frame. At 232, the access point 112 transmits a frame of HAP data to the electronic device 110 via the WLAN, and, at 234, the electronic device 110 receives the frame of HAP data. At 236, the electronic device 110 transmits an ACK frame to the access point 112 via the WLAN to acknowledge receipt of the HAP data, and, at 238, the access point 112 receives the ACK frame.

It will be appreciated that although the WLAN is described as being implemented over one or more channels in the 5 GHz RF spectrum, nothing in the detailed description should be construed as limiting all embodiments of the WLAN to be implemented on a particular channel or frequency range of the RF spectrum. In other embodiments, the WLAN can be implemented on one or more communication channels in a different portion of the RF spectrum, such as the 2.4 GHz RF spectrum, a 6 GHz RF spectrum, and the like.

Figure 3:
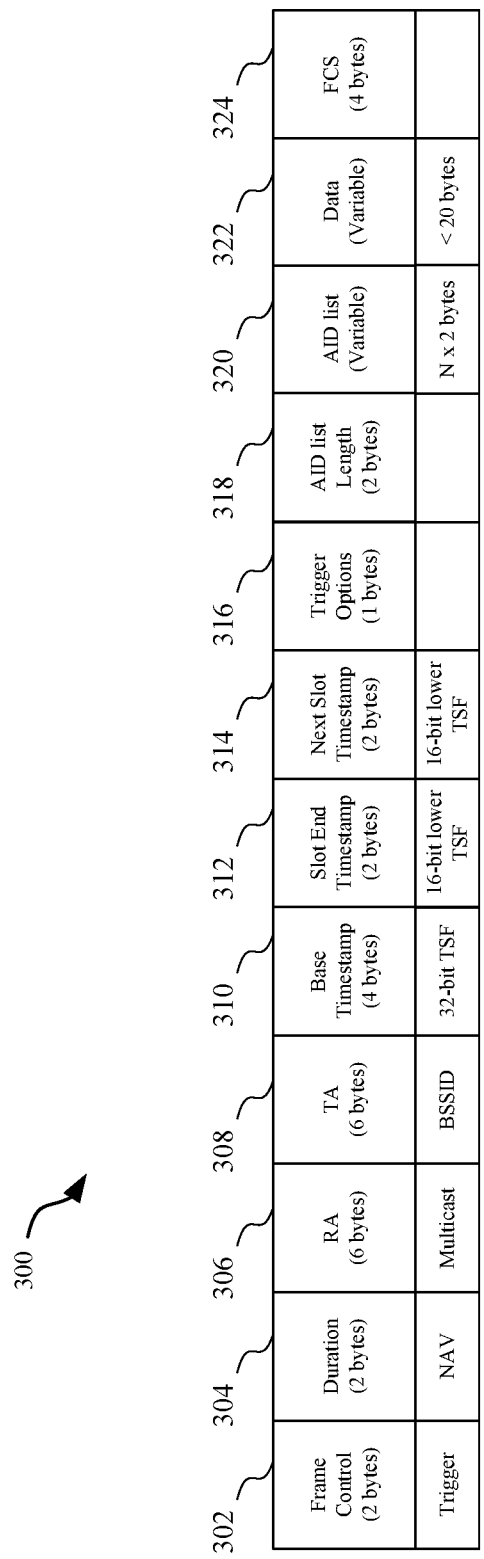
FIG. 3 illustrates a trigger frame communicated from the access point to an electronic device, in accordance with some embodiments.

FIG. 3 illustrates a trigger frame 300 communicated from the access point 112 to an electronic device 110, in accordance with some embodiments. In particular, the trigger frame 300 can include a number of fields. In some embodiments, the trigger frame 300 includes the following fields: a frame control field 302, a duration field 304, a receive address (RA) field 306, a transmit address (TA) field 308, a base timestamp field 310, a slot end timestamp field 312, a next slot timestamp field 314, a trigger options field 316, an AID list length field 318, an AID list field 320, an optional data field 322, and a frame check sequence (FCS) field 324. While example lengths in bytes are provided in FIG. 3, any/all of the lengths can be modified, and one or more fields can be added, removed, or modified in other implementations.

Trigger frame 300 can be referred to as a control frame. Note that the trigger frame 300 specifies an ordered list of electronic devices (e.g., in AID list field 320) that can use an uplink of the communications medium in the order specified in the AID list field 320. The specific access mechanisms utilized to allocate specific transmission opportunities to each electronic device in the ordered list is described in more detail below.

In some embodiments, the frame control field 302 is fixed at two bytes. The frame control field 302 can be set to indicate the trigger frame 300 is a low latency Wi-Fi trigger frame. The frame control field 302 distinguishes a low latency Wi-Fi trigger frame from other types of frames, such as ACK frames or data frames.

In some embodiments, the duration field 304 is fixed at two bytes. The duration field 304 can be set to indicate a remaining time of a contention-free period associated with the WLAN. As used herein, a contention-free period refers to a set interval where the access point 112 is responsible for allocating resource units of the communications medium to various electronic devices 110 connected to the WLAN. In some embodiments, the value of the duration field 304 can be referred to as a network allocation vector (NAV) that indicates the remaining time in a contention-free period.

In some embodiments, the RA field 306 and the TA field 308 are fixed at six bytes. The RA field 306 can be set to a multicast or broadcast address of the WLAN such that all electronic devices 110 associated with the multicast or broadcast address receive the trigger frame 300. The TA field 308 can be set to the BSSID for the WLAN.

In some embodiments, the base timestamp field 310 is fixed at four bytes, and the slot end timestamp field 312 and the next slot timestamp field 314 are fixed at two bytes. The base timestamp field 310 includes the lower 32-bits of the access point 112 timing synchronization function (TSF) at a point in time the trigger frame 300 was generated. The TSF is a timer with modulus $2^{64}$ (e.g., 64-bit timer) counting in increments of microseconds (e.g., ticking on 1 MHz clock). Each electronic device 110 maintains a separate TSF that is synchronized with the access point 112 TSF utilizing a timestamp included in periodic beacon frames transmitted by the access point 112.

In a scheduled access mechanism, as described in more detail below, the slot end timestamp field 312 includes the lower 16-bits of the access point 112 TSF corresponding to the scheduled end of the current uplink slot associated with the trigger frame 300, and the next slot timestamp field 314 includes the lower 16-bits of the access point 112 TSF corresponding to the scheduled start of the next scheduled uplink slot for the first electronic device 110 in the AID list field 320 during the next contention-free period. In an unscheduled access mechanism, as described in more detail below, the slot end timestamp field 312 and the next slot timestamp field 314 can be ignored in favor of the duration field 304, which indicates the end of the current contention-free period.

In some embodiments, the trigger options field 316 is fixed at one byte. The trigger options field 316 can include a number of flags. For example, a scheduled trigger flag can be set to one to indicate the trigger frame 300 is associated with a scheduled access mechanism where each electronic device 110 is allocated a fixed slot within the contention-free period, or the scheduled trigger flag can be set to zero to indicate the trigger frame 300 is associated with an unscheduled access mechanism where each electronic device 110 is triggered in order as listed in the AID list field 320. The trigger options field 316 can also include an explicit trigger flag that can be set to one to indicate that each electronic device 110 included in the AID list field 320 will be triggered by a separate trigger frame or can be set to zero to indicate multiple electronic devices 110 are triggered, in an order as specified in the AID list field 320, in response to a single trigger frame. The trigger options field 316 can also include an immediate ACK flag that can be set to one to indicate each uplink packet will be acknowledged by a separate ACK frame or can be set to zero to indicate that multiple uplink packets can be acknowledged by a single ACK frame.

In some embodiments, the AID list length field 318 is fixed at two bytes. The AID list length field 318 is set to indicate a number of electronic devices 110 that are allocated an uplink slot in the current contention-free period. It will be appreciated that the value of the AID list length field 318 indicates the number of separate and distinct electronic devices 110 referenced in the AID list field 320.

In some embodiments, the AID list field 320 includes a list of AIDs for one or more electronic devices 110 allocated uplink slots within the current contention-free period. A size of the AID list field 320 is variable between two and 2N bytes, where N is the number of electronic devices 110 allocated uplink slots within the current contention-free period.

In some embodiments, an optional data field 322 can include any additional data transmitted from the access point 112 to the electronic device 110. In some embodiments, the data field 322 can be utilized to transmit feedback information to an electronic device 110. For example, the access point 112 can transmit haptic data to an electronic device 110 within the trigger frame 300. The data field 322 can be used for various purposes but is typically limited in size, e.g., less than 20 bytes. More substantial information passed between the access point 112 and the electronic device 110 can be transmitted within a separate data frame, as discussed below.

In some embodiments, the FCS field 324 is fixed at four bytes. The FCS field 324 contains an error-detecting code that is added to the end of the trigger frame 300. The value contained in the FCS field 324 is calculated based on the values in one or more other fields of the frame, such as the frame control field 302, the duration field 304, the RA field 306, and so forth. Receiving stations can check the integrity of the received trigger frame 300 by checking the value in the FCS field 324 against a value calculated from the values in one or more other fields in the received trigger frame 300.

It will be appreciated that, in other embodiments, the format of the trigger frame 300 can be different than the format set forth above. For example, the AID list length can be fixed at N devices and the AID list length field 318 can be omitted from the trigger frame 300. As another example, the FCS field 324 can be omitted where the communications protocol does not implement error checking. In some embodiments, the order of the fields in the frame can be changed. For example, the trigger options field 316 can be ordered after the data field 322.

Figure 4:
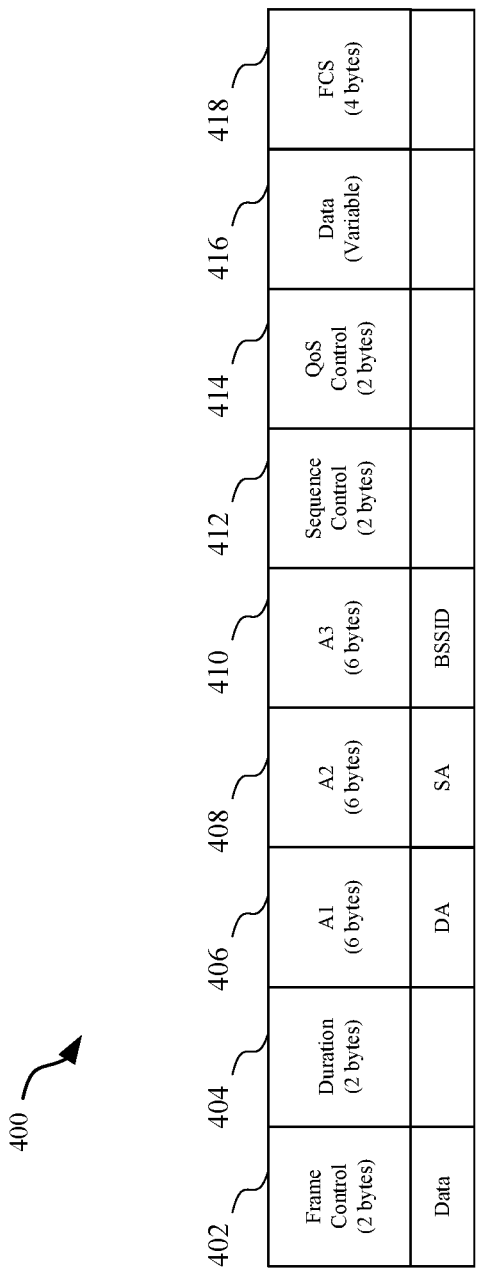
FIG. 4 illustrates a data frame communicated between stations in the WLAN, in accordance with some embodiments.

FIG. 4 illustrates a data frame 400 communicated between stations in the WLAN, in accordance with some embodiments. In particular, the data frame 400 can include a number of fields. In some embodiments, the data frame 400 includes the following fields: a frame control field 402, a duration field 404, a first address (A1) field 406, a second address (A2) field 408, a third address (A3) field 410, a sequence control field 412, a Quality of Service (QoS) control field 414, a data field 416, and a frame check sequence (FCS) field 418. While example lengths in bytes are provided in FIG. 4, any/all of the lengths can be modified, and one or more fields can be added, removed, or modified in other implementations.

In some embodiments, the frame control field 402 is fixed at two bytes. The frame control field 402 can be set to indicate the data frame 400 includes a data payload and to differentiate the data frame from other control and management frames such as RTS/CTS frames, ACK frames, and the like.

In some embodiments, the duration field 404 is fixed at two bytes. The duration field 404 can be set to a fixed value, e.g., 32767 when the data frame 400 is transmitted within a contention-free period. In other embodiments, the duration field 404 can be set to a value that indicates the length of the data frame 400.

In some embodiments, the address fields, e.g., the A1 field 406, the A2 field 408, and the A3 field 410 are fixed at six bytes. The A1 field 406 can be set to destination address (DA), the A2 field 408 can be set to the source address (SA), and the A3 field 410 can be set to the BSSID for the WLAN. The address fields can take the form of conventional IEEE 802.11 MAC addresses.

In some embodiments, the sequence control field 412 is fixed at two bytes. The sequence control field 412 includes a sequence number and fragment number for a sequence of data frames. The sequence control field 412 can be used in a burst mode where multiple data frames are sent in order prior to receiving an ACK frame in response.

In some embodiments, the QoS control field 414 is fixed at two bytes. The QoS control field 414 includes parameters related to providing QoS for a data stream of one or more data frames. The parameters can include a QoS type (e.g., video, audio, etc.), a priority value, as well as other parameters for implementing a QoS algorithm.

In some embodiments, a data field 416 can include any data transmitted from one station to another station. The data field 416 is variable size, but can be limited at the upper end by a maximum size of a frame transmitted over the communications medium minus the number of bytes for the MAC header and MAC footer (e.g., FCS field 418).

In some embodiments, the FCS field 418 is fixed at four bytes. The FCS field 324 contains an error-detecting code that is added to the end of the data frame 400. The value contained in the FCS field 324 is calculated based on the values in one or more other fields of the data frame, such as the frame control field 402, the duration field 404, the address fields 406/407/408, and so forth. Receiving stations can check the integrity of the received data frame by checking the value in the FCS field 418 against a value calculated from the values in one or more other fields in the received data frame.

Figure 5:
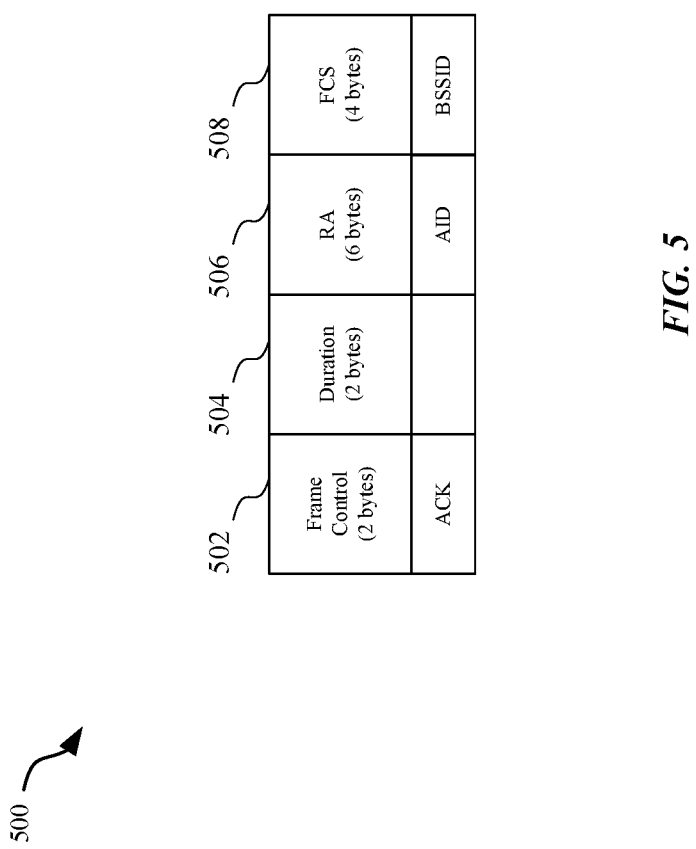
FIG. 5 illustrates an acknowledgment frame communicated between stations in the WLAN, in accordance with some embodiments.

FIG. 5 illustrates an acknowledgment (ACK) frame 500 communicated between stations in the WLAN, in accordance with some embodiments. In particular, the ACK frame 500 can include a number of fields. In some embodiments, the ACK frame 500 includes the following fields: a frame control field 502, a duration field 504, a receive address (RA) field 506, and a FCS field 508. While example lengths in bytes are provided in FIG. 5, any/all of the lengths can be modified, and one or more fields can be added, removed, or modified in other implementations.

In some embodiments, the frame control field 502 is fixed at two bytes. The frame control field 502 can be set to indicate the ACK frame 500 is an acknowledgment of successful receipt of a previously transmitted frame transmitted over the communications medium by a station.

In some embodiments, the duration field 504 is fixed at two bytes. The duration field 504 can be set to a fixed value, e.g., 32767 when the ACK frame 500 is transmitted within a contention-free period. In other embodiments, the duration field 504 can be set to a value that indicates the length of the ACK frame 500.

In some embodiments, the RA field 506 is fixed at six bytes. The RA field 506 includes an 802.11 MAC address for the station that sent the frame being acknowledged.

In some embodiments, the FCS field 508 is fixed at four bytes. The FCS field 508 contains an error-detecting code that is added to the end of the ACK frame 500. The value contained in the FCS field 508 is calculated based on the values in one or more other fields of the ACK frame 500, such as the frame control field 502, the duration field 504, and the RA field 506. Receiving stations can check the integrity of the received ACK frame 500 by checking the value in the FCS field 508 against a value calculated from the values in one or more other fields in the received ACK frame 500.

In some embodiments, the format of the ACK frame 500 can also be used as a clear-to-send (CTS) frame, where the frame control field 502 includes a different value that indicates the frame is a CTS frame instead of an ACK frame.

Figure 6:
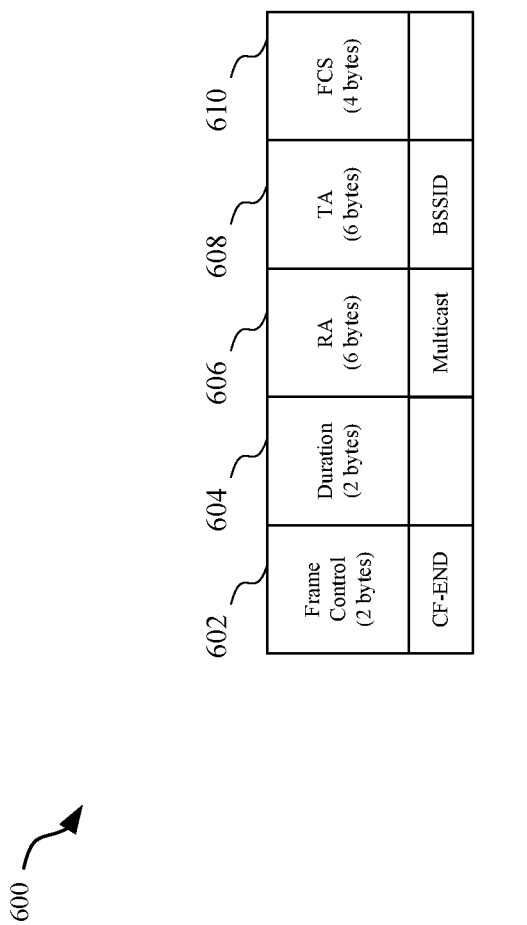
FIG. 6 illustrates a contention-free end frame communicated from the access point to an electronic device, in accordance with some embodiments.

FIG. 6 illustrates a contention-free end (CF-END) frame 600 communicated from the access point 112 to an electronic device 110, in accordance with some embodiments. In particular, the CF-END frame 600 can include a number of fields. In some embodiments, the CF-END frame 600 includes the following fields: a frame control field 602, a duration field 604, a receive address (RA) field 606, a transmit address (TA) field 608, and an FCS field 610. While example lengths in bytes are provided in FIG. 6, any/all of the lengths can be modified, and one or more fields can be added, removed, or modified in other implementations.

In some embodiments, the frame control field 602 is fixed at two bytes. The frame control field 602 can be set to indicate the CF-END frame 600 identifies the end of the contention-free period.

In some embodiments, the duration field 604 is fixed at two bytes. The duration field 604 can be set to a fixed value, e.g., 32767 when the CF-END frame 600 is transmitted within a contention-free period. In other embodiments, the duration field 604 can be set to a value that indicates the length of the CF-END frame 600.

In some embodiments, the RA field 606 and the TA field 608 are fixed at six bytes. The RA field 606 can be set to a multicast or broadcast address of the WLAN such that all electronic devices 110 associated with the multicast or broadcast address receive the CF-END frame 600. The TA field 608 can be set to the BSSID for the WLAN.

In some embodiments, the FCS field 608 is fixed at four bytes. The FCS field 608 contains an error-detecting code that is added to the end of the CF-END frame 600. The value contained in the FCS field 608 is calculated based on the values in one or more other fields of the CF-END frame 600, such as the frame control field 602, the duration field 604, the RA field 606, and the TA field 608. Receiving stations can check the integrity of the received CF-END frame 600 by checking the value in the FCS field 608 against a value calculated from the values in one or more other fields in the received CF-END frame 600.

In some embodiments, the format of the CF-END frame 600 can also be used as a request-to-send (RTS) frame, where the frame control field 602 includes a different value that indicates the frame is a RTS frame instead of a CF-END frame.

In some embodiments, each electronic device 110 can transmit an RTS frame to the access point 112 prior to transmitting a data frame via the communications medium. In such embodiments, the electronic device 110 will confirm receipt of a corresponding CTS frame from the access point 112 prior to sending the data frame.

Several contention-free access mechanisms utilized by the WLAN are now described. During the communication technique, the access point can transmit a trigger frame via the communications medium in order to allocate an uplink slot (e.g., a transmission opportunity) during a contention-free period to a particular electronic device. The electronic devices can transmit data via the communications medium during their allocated transmission opportunity if they have buffered or queued data. Otherwise, an electronic device can elect not to transmit on the uplink during the allocated transmission opportunity. When that occurs, the next electronic device in the ordered list of electronic devices can be allocated the next transmission opportunity.

The WLAN is managed by the access point 112. Management of the WLAN can include allocating resource units of the communications medium, managing connections to the WLAN, monitoring the communications medium for interference from other signals, and so forth. The AP 112 specifically allocates resource units of the communications medium, via the transmission of trigger frames, to particular electronic devices 110 to transmit via the communications medium according to a contention-free access mechanism.

Figure 7A:
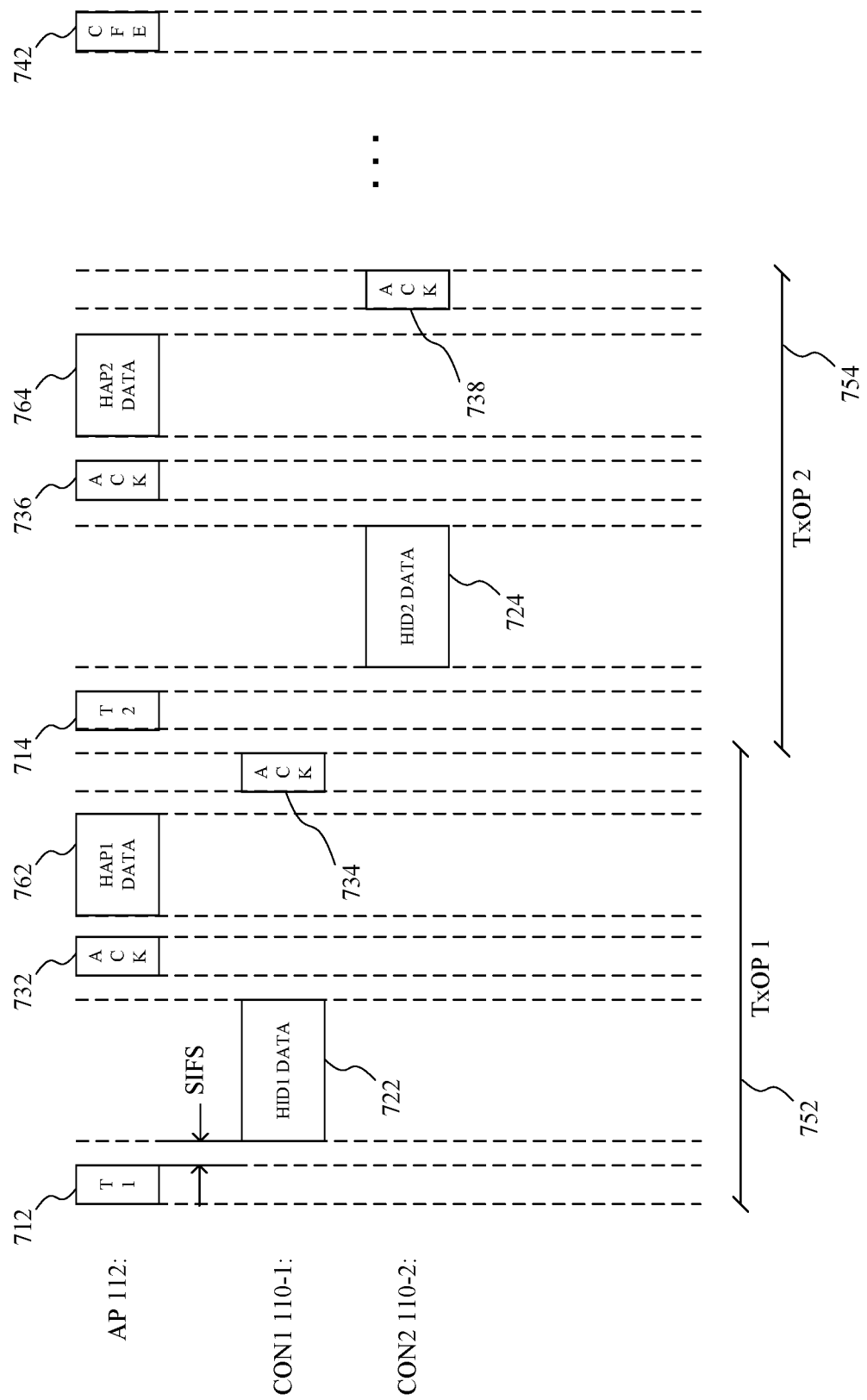
FIG. 7A illustrates an unscheduled access mechanism, in accordance with some embodiments.

FIG. 7A illustrates an unscheduled access mechanism, in accordance with some embodiments. The unscheduled access mechanism refers to an algorithm, implemented by the processing subsystem of the access point, where the duration of a transmission opportunity is not pre-defined by the access point. Instead, a start of each transmission opportunity in at least two transmission opportunities within the contention-free period is adjusted dynamically by the processing subsystem based on traffic transmitted via the communications medium.

According to operation of the unscheduled access mechanism, the access point 112 determines an order of a number of transmission opportunities in a particular contention-free period allocated to one or more electronic devices 110 connected to the WLAN. The access point 112 then transmits trigger frames over the communications medium according to the order, allowing the various electronic devices 110 connected to the WLAN to transmit data to the access point 112 in one or more frames.

In other words, as depicted in FIG. 7, at the start of a contention-free period, the access point 112 transmits a first trigger frame 712 to a first electronic device 110-1. In response to the first trigger frame 712, the first electronic device 110-1 transmits a frame of HID data 722 to the access point 112 after a specified delay. In some embodiments, the delay utilized by the unscheduled access medium has a duration of 16 microseconds (μs) and can be referred to as a Short InterFrame Space (SIFS), which is utilized for high-priority transmissions in other contention-based protocols. In other embodiments, the delay can be increased or decreased (e.g., the delay can be 10 μs). Upon receiving the frame of HID data 722 and after a delay (e.g., SIFS), the access point 112 transmits an ACK frame 732 to the first electronic device 110-1. In some embodiments, the ACK frame 732 indicates the end of the first transmission opportunity 752 allocated to the first electronic device 110-1.

However, in other embodiments, the access point 112 can be configured to extend the first transmission opportunity 752 to provide feedback information to the first electronic device 110-1 by sending one or more data frames to the electronic device 110-1. As depicted in FIG. 7, the access point 112 can transmit a frame of HAP data 762 to the first electronic device 110-1. In some embodiments, the frame of HAP data 762 can include control signals for a haptic feedback system included in the controller, such as a vibration device or an audio transducer. In other embodiments, the frame of HAP data 762 can include other types of feedback information. It will be appreciated that the frame of HAP data 762 can be replaced by one or more data frames 400 including any generic information transmitted from the access point 112 to the electronic device 110. After receiving the frame of HAP data 762, the first electronic device 110-1 responds by transmitting an ACK frame 734 to the access point 112, thereby indicating the end of the first transmission opportunity 752 allocated to the first electronic device 110-1.

After a delay (e.g., SIFS) and at the start of a second transmission opportunity 754, the access point 112 transmits a second trigger frame 714 to a second electronic device 110-2. In response to the second trigger frame 714, the second electronic device 110-2 transmits a frame of HID data 724 to the access point 112 after a specified delay. Upon receiving the frame of HID data 724 and after a delay (e.g., SIFS), the access point 112 transmits an ACK frame 736 to the second electronic device 110-2. In some embodiments, the ACK frame 736 indicates the end of the second transmission opportunity 754 allocated to the second electronic device 110-2. In other embodiments, the access point 112 transmits a frame of HAP data 764 to the second electronic device 110-2, and the second electronic device 110-2 transmits a corresponding ACK frame 738 to the access point 112. The ACK frame 738 indicates the end of the second transmission opportunity 754 allocated to the second electronic device 110-2.

The access point 112 can continue sending trigger frames and receiving frames of HID data for zero or more additional electronic devices 110 connected to the WLAN in accordance with the order determined by the access point 112. Once all transmission opportunities have been allocated to the electronic devices 110 connected to the WLAN, the access point 112 transmits a CF-END frame 742 indicating the end of the contention-free period. The number of transmission opportunities that are available within a particular contention-free period depends on a duration of the contention-free period, the size and/or data rate associated with each of the frames transmitted during each transmission opportunity, a maximum size of a frame (e.g., maximum size of the frame of HID data), and so forth. Consequently, in the unscheduled access mechanism, the total number of transmission opportunities within a fixed contention-free period is unknown at the start of the contention-free period.

Figure 7B:
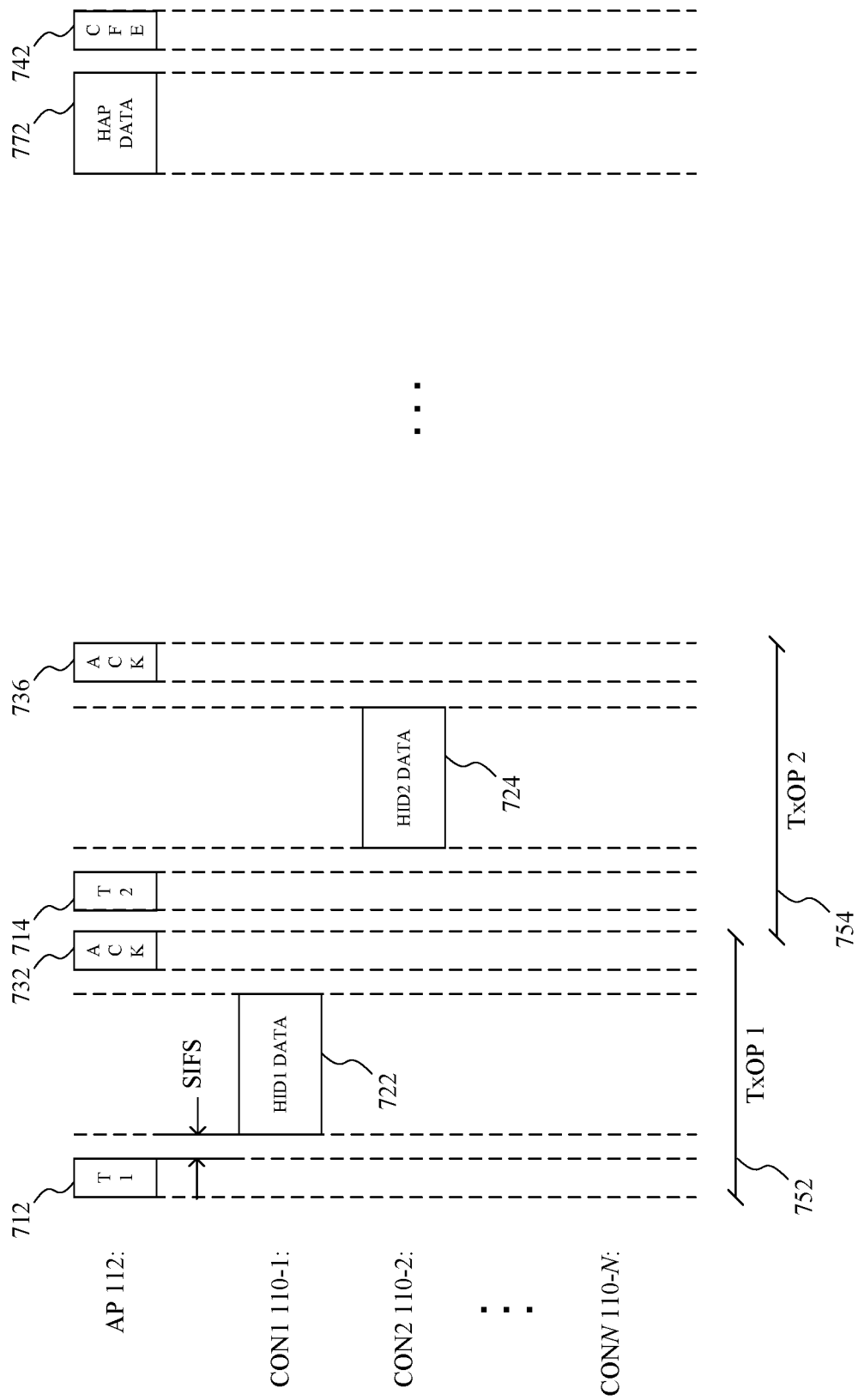
FIG. 7B illustrates an unscheduled access mechanism, in accordance with other embodiments.

FIG. 7B illustrates an unscheduled access mechanism, in accordance with other embodiments. Unlike in the unscheduled access mechanism of FIG. 7A, the unscheduled access mechanism of FIG. 7B transmits a frame of bulk HAP data 772 to a number of electronic devices 110 at the end of the contention-free period. Consequently, the transmission opportunities are merely utilized for the electronic devices 110 to transmit frames of HID data 722, 724, etc. to the access point 112. The feedback information included in the various frames of HAP data 762, 764, etc. transmitted to the corresponding electronic devices 110 can be queued and broadcast or multicast to a number of electronic devices 110 at the end of the contention-free period in the frame of bulk HAP data 772 rather than sending multiple frames of HAP data 762, 764, etc. targeted to particular electronic devices 110 to each of the corresponding electronic devices 110. It will be appreciated that each of the electronic devices 110 does not need to transmit an ACK frame to the access point 112 when bulk HAP data is transmitted in a broadcast or multicast data frame at the end of the contention-free period.

In other embodiments, bulk HAP data can be transmitted to a number of electronic devices 110 every M transmission opportunities. For example, the access point 112 allocates four transmission opportunities to four electronic devices 110 and multicasts or broadcasts a frame of HAP data associated with the four electronic devices 110. Then, the access point 112 allocates four additional transmission opportunities to four additional electronic devices 110 and multicasts or broadcasts another frame of HAP data associated with the four additional electronic devices 110. Consequently, multiple frames of bulk HAP data 772 can be transmitted by the access point 112 during a contention-free period, each frame of bulk HAP data directed to a different subset of electronic devices 110.

Figure 8:
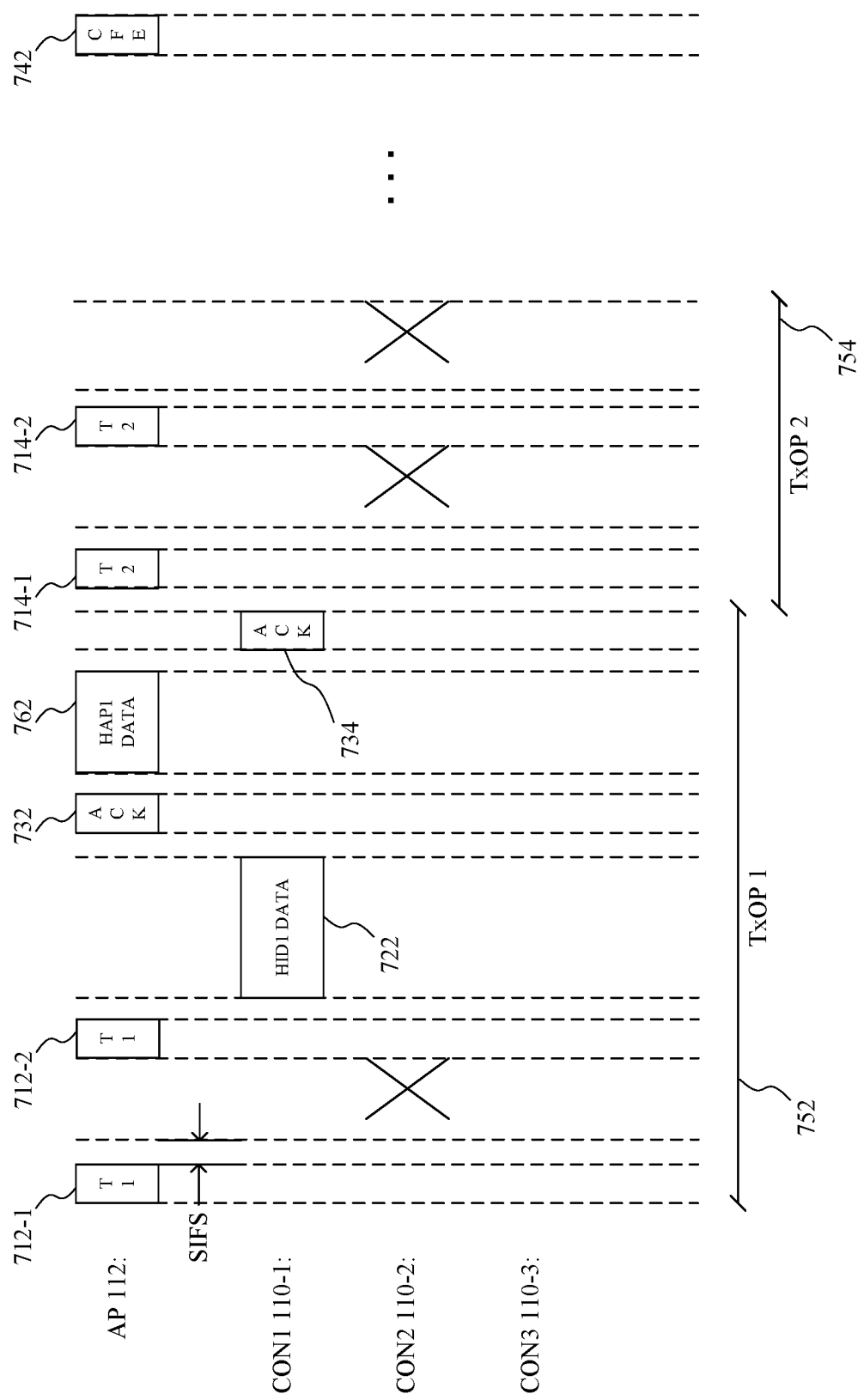
FIG. 8 illustrates an unscheduled access mechanism with retries, in accordance with some embodiments.

FIG. 8 illustrates an unscheduled access mechanism with retries, in accordance with some embodiments. In some cases, a particular electronic device 110 can fail to send HID data to the access point 112 in response to a trigger frame. In other cases, an electronic device 110 can fail to receive a trigger frame. This failure can be caused by, among other reasons, interference on the communications medium, inadequate signal strength, and the like. In other cases, the electronic device 110 can receive the trigger frame; however, the electronic device 110 can determine that there is no buffered or queued data to send to the access point 112. In yet other cases, the electronic device 110 can attempt to transmit the HID data to the access point 112; however, the access point 112 can fail to receive the HID data due to, e.g., interference, inadequate signal strength, and the like.

In some cases, the access point 112 can be configured to perform a number of retries when a particular electronic device 110 fails to respond to a trigger frame. As depicted in FIG. 8, the access point 112 can wait for a specified time after transmission of the trigger frame to receive a response from the electronic device 110. If a response (e.g., a frame of HID data) is not received within the specified time, then the access point 112 can attempt to re-transmit the trigger frame. In some cases, re-transmitting the trigger frame will result in receipt of the frame of HID data from the electronic device (as illustrated during the first transmission opportunity 752 allocated to the first electronic device 110-1), at which point an ACK frame is transmitted to the electronic device 110. In other cases, re-transmitting the trigger frame will not result in the receipt of the frame of HID data from the electronic device (as illustrated during the second transmission opportunity 754 allocated to the second electronic device 110-2), where no ACK frame is transmitted to the electronic device and, instead, a new trigger frame associated with a new transmission opportunity can be transmitted to a different electronic device 110.

It will be appreciated that, in various embodiments, the number of retry attempts implemented by the access point 112 during each transmission opportunity can be dynamically set at zero or more. In some embodiments, the number of retries can be set based on the number of electronic devices connected to the WLAN. It will be appreciated that failures and subsequent retries can increase the duration of a particular transmission opportunity within the contention-free period. A large number of failures and subsequent retries can mean fewer transmission opportunities can be allocated within a particular contention-free period of fixed length. Consequently, an access point cannot guarantee that all electronic devices 110 are allocated a transmission opportunity before the expiration of the contention-free period (e.g., before expiration of the NAV set in the duration field 304 of the trigger frame 300). In some embodiments, each transmission opportunity is associated with a maximum duration, and a duration of a particular transmission opportunity can be less than or equal to the maximum duration. Consequently, the access point can guarantee that a minimum number of electronic devices 110 are allocated a transmission opportunity within the contention-free period.

A major problem with contention-based access mechanisms implemented in legacy Wi-Fi is that Quality of Service (QoS) cannot be ensured due to the variable latency associated with the contention-based access mechanisms. In contrast, low latency Wi-Fi can be implemented by limiting the duration of the contention-free period and allocating transmission opportunities to electronic devices 110 according to a duty cycle associated with a series of contention-free periods. For example, in some embodiments, the access point 112 sets the contention-free period to have a duration of 2 ms. A number of transmission opportunities can be allocated to one or more electronic devices 110 within the contention-free period, followed by a number of additional transmission opportunities allocated to the one or more electronic devices 110 in a subsequent contention-free period.

In some embodiments, QoS can be provided to at least one electronic device 110 by prioritizing the at least one electronic device 110 within the order of electronic devices 110 listed in the AID list field 320 of a trigger frame 300. In some cases, a maximum size of a frame along with knowledge of the number of allowed retries per transmission opportunity and an order and type of frames transmitted during a transmission opportunity as well as a duration of the contention-free period can determine a minimum number of transmission opportunities per contention-free period. The minimum number of transmission opportunities can represent a number of electronic devices 110 for which a particular QoS can be ensured utilizing the unscheduled access mechanism. In this manner, low latency Wi-Fi can be provided for real-time applications such as streaming video, audio, gaming, and the like.

In some embodiments, the individual controllers might benefit from reduced power consumption when configured to communicate with the WLAN according to the aforementioned communication techniques. In such embodiments, the stations can advantageously enter a low-power mode during at least a portion of the contention-free period in order to reduce power consumption of the electronic device 110.

In some embodiments, each trigger frame transmitted by the access point 112 includes an AID list field 320 indicating the electronic devices 110 that will be allocated a transmission opportunity during the contention-free period, if sufficient resource units are available. The trigger frames transmitted by the access point 112 also include an indication of the end of the current contention-free period, relative to the base timestamp field 310, in the duration field 304. Consequently, each electronic device 110 can inspect the AID list field 320 to determine if an AID associated with that particular electronic device 110 is listed in the AID list field 320. If the corresponding AID for that electronic device 110 is not included in the AID list field 320 of the trigger frame, then the electronic device 110 can enter the low power mode until the end of the current contention-free period. In some embodiments, the low power mode includes disabling the radio 114 and/or signal processing circuitry associated with the physical layer of the WLAN.

Figure 9:
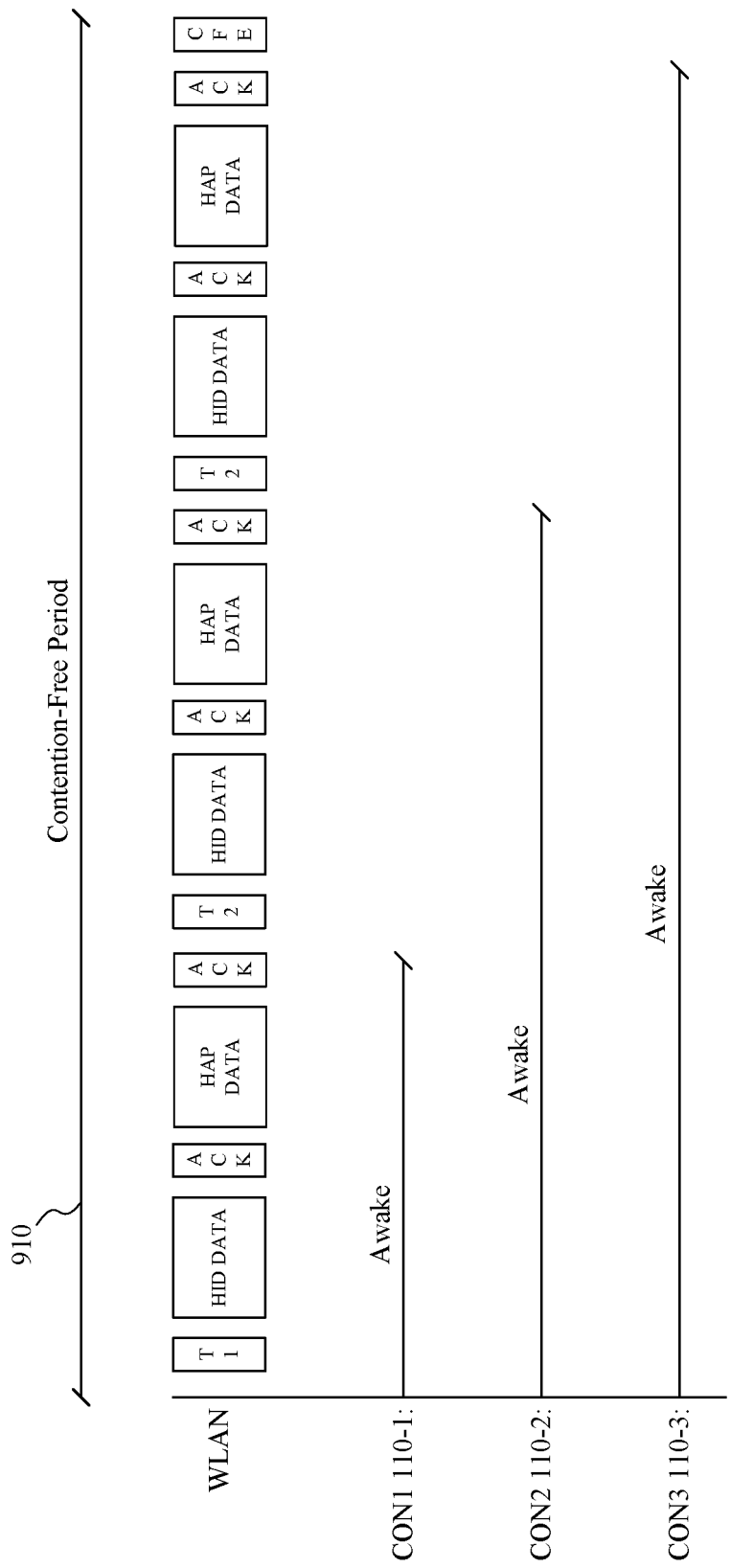
FIG. 9 illustrates a sleep cycle for a number of electronic devices utilizing the unscheduled access mechanism to communicate via the WLAN, in accordance with some embodiments.

FIG. 9 illustrates a sleep cycle for a number of electronic devices utilizing the unscheduled access mechanism to communicate via the WLAN, in accordance with some embodiments. All electronic devices 110 connected to the WLAN should wake up at the beginning of the contention-free period 910 and listen to the communications medium to receive trigger frames.

As depicted in FIG. 9, at the beginning of the contention-free period 910, a first trigger frame 712, transmitted by the access point 112, allocates a first transmission opportunity to a first electronic device 110-1. The first electronic device 110-1 responds to the first trigger frame 712 by transmitting a frame of HID data 722 to the access point 112. The access point 112 then transmits an ACK frame 732 to the first electronic device 110-1 followed by a frame of HAP data 762. The first electronic device 110-1 then sends a corresponding ACK frame 734 to the access point 112, thereby ending the first transmission opportunity.

Once the first transmission opportunity is concluded, the first electronic device 110-1 can enter a low power mode, sometimes referred to as a sleep mode. Prior to entering the low power mode, the first electronic device 110-1 can calculate a wake up time, relative to a value of the TSF of the first electronic device 110-1, corresponding to the start of the next contention-free period. The first electronic device 110-1 can be configured to exit the low power mode at or prior to the wake up time. In some embodiments, an electronic device 110 can set a wake-up timer based on the wake-up time that corresponds to a start of the subsequent contention-free period. The expiration of the wake-up timer is configured to trigger an operation to exit the low power mode.

The other electronic devices 110 remain awake during the first transmission opportunity to await the next trigger frame. At the beginning of the second transmission opportunity, a second trigger frame 714, transmitted by the access point 112, allocates a second transmission opportunity to a second electronic device 110-2. The second electronic device 110-2 responds to the second trigger frame 714 by transmitting a frame of HID data 724 to the access point 112. The access point 112 then transmits an ACK frame 736 to the second electronic device 110-2 followed by a frame of HAP data 764. The second electronic device 110-2 then sends a corresponding ACK frame 738 to the access point 112, thereby ending the second transmission opportunity.

Once the second transmission opportunity is concluded, the second electronic device 110-2 can enter the low power mode. Prior to entering the low power mode, the second electronic device 110-2 can calculate a wake up time, relative to a value of the TSF of the second electronic device 110-2, corresponding to the start of the next contention-free period. The second electronic device 110-2 can be configured to exit the low power mode at or prior to the wake up time.

The third electronic device 110-3 similarly enters a low power mode subsequent to the conclusion of a corresponding transmission opportunity allocated to the third electronic device 110-3. It will be appreciated that the ratio of an awake period to a sleep period for each electronic device 110 depends on a position of the transmission opportunity allocated to the corresponding electronic device 110 during the contention-free period 910. For example, a ratio of the awake period to sleep period for the first electronic device 110-1 is lower than the ratio of the awake period to sleep period for the fourth electronic device 110-4. Consequently, power consumption of the fourth electronic device 110-4 is typically greater than the power consumption of the first electronic device 110-1, all other things being equal (e.g., the amount of data transmitted via the WLAN, transmission power, etc.).

In some embodiments, the access point 112 is configured to mitigate uneven power consumption effects by adjusting the order of the transmission opportunities allocated to the various electronic devices 110 during a number of contention-free periods according to a round-robin schedule. For example, during a first contention-free period, the order of electronic devices 110 can be selected as 110-1, 110-2, and 110-3; during a second contention-free period, the order of electronic devices 110 can be selected as 110-2, 110-3, and 110-1; and during a third contention-free period, the order of electronic devices 110 can be selected as 110-3, 110-1, and 110-2. Consequently, this round-robin scheduling ensures that, on average over a number of contention-free periods, the ratio of awake period to sleep period for all electronic devices is approximately similar.

The ability to sleep between transmission opportunities allocated to a particular electronic device 110 can be instrumental in saving power and extending the battery life of mobile devices. The unscheduled access mechanism described above is not conducive to absolute efficiency when determining when an electronic device 110 can enter the low power mode and when the electronic device 110 needs to wake up. Due to the nature of the unscheduled access mechanism, each electronic device is only aware, a priori, when the next contention-free period is scheduled to begin and whether the access point 112 will attempt to allocate a transmission opportunity to the electronic device 110 during the current contention-free period. This means that the electronic device 110 must remain awake and listen to the communications medium for a trigger frame targeted at that device, even during a duration of one or more other transmission opportunities allocated to different electronic devices 110.

Figure 10A:
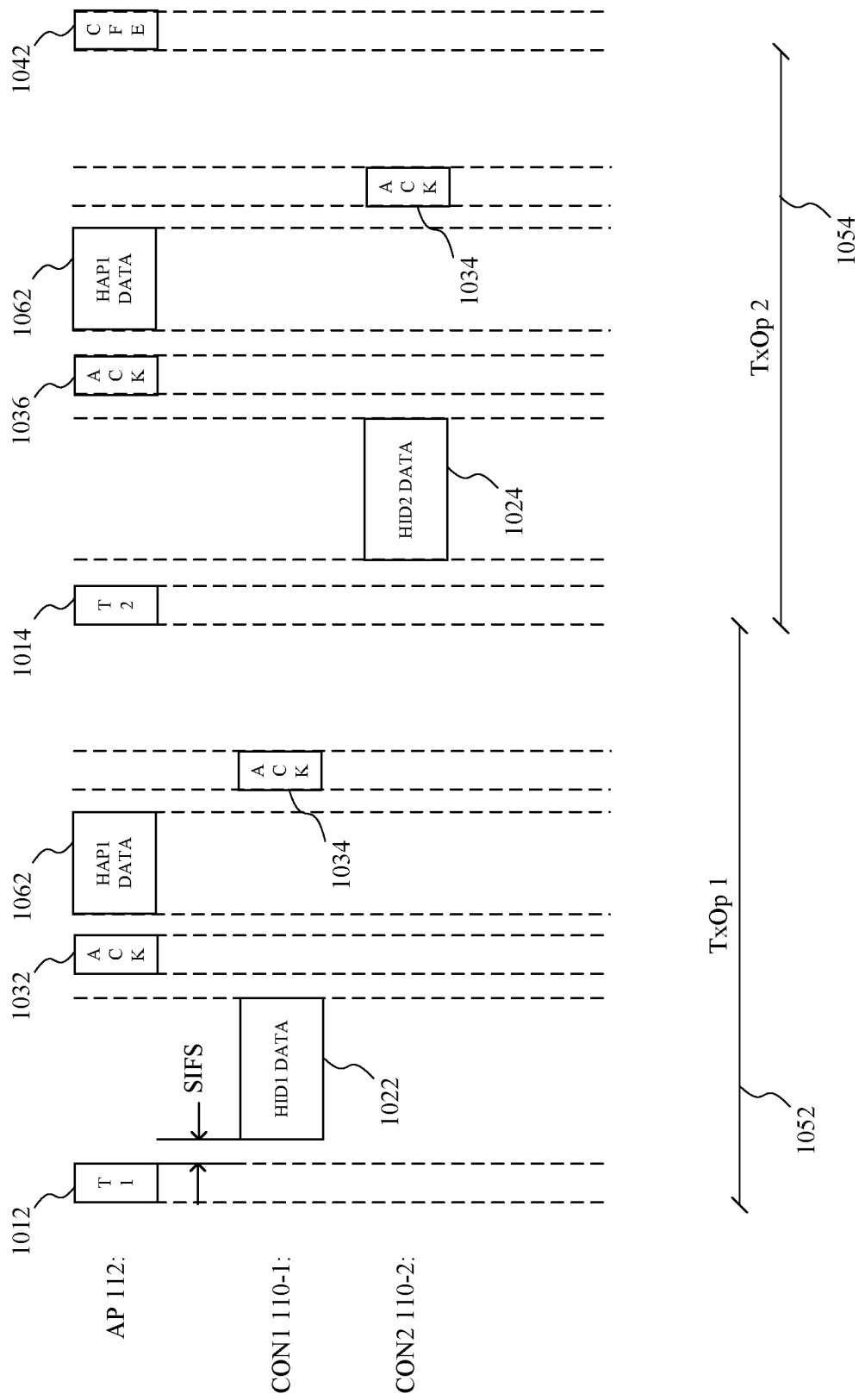
FIG. 10A illustrates a scheduled access mechanism, in accordance with some embodiments.

FIG. 10A illustrates a scheduled access mechanism, in accordance with some embodiments. The scheduled access mechanism refers to an access mechanism where a start of each transmission opportunity in the at least two transmission opportunities within the contention-free period is fixed by the processing subsystem of the access point 112 according to a schedule. In some embodiments, the schedule is determined prior to the start of each contention-free period. In some embodiments, a duration of each transmission opportunity within the contention-free period is set equal to a duration of the contention-free period divided by a number of electronic devices in the ordered list of electronic devices. In other embodiments, a duration of each transmission opportunity within the contention-free period can be set based on a QoS type or priority value associated with each electronic device of a number of electronic devices. For example, a larger transmission opportunity can be granted to a video QoS type than an audio QoS type. Nevertheless, the duration of each transmission opportunity is fixed at the start of a contention-free period and is not adjusted dynamically based on the traffic transmitted via the communications medium.

According to the scheduled access mechanism, the access point 112 determines an order of a number of transmission opportunities in a particular contention-free period allocated to one or more electronic devices 110 connected to the WLAN. The access point 112 is configured to divide the contention-free period into a number of discrete transmission opportunities that are allocated to particular electronic devices 110 at specific times within the contention-free period. The access point 112 then transmits trigger frames over the communications medium according to the order and at the specific times, allowing the various electronic devices 110 connected to the WLAN to transmit HID data to the access point 112 during a corresponding transmission opportunity.

In other words, as depicted in FIG. 10, at the start of a contention-free period, the access point 112 transmits a first trigger frame 1012 to a first electronic device 110-1 at the beginning of a first transmission opportunity 1052. In response to the first trigger frame 1012, the first electronic device 110-1 transmits a frame of HID data 1022 to the access point 112 after a specified delay. Upon receiving the frame of HID data 1022 and after the delay (e.g., SIFS), the access point 112 transmits an ACK frame 1032 to the first electronic device 110-1. Following the ACK frame 1032 and after a delay, the access point 112 transmits a frame of HAP data 1062 to the first electronic device 110-1. The first electronic device 110-1 then transmits an ACK frame 1034 to the access point 112. Unlike in the unscheduled access mechanism, described above, the ACK frame 1034 does not indicate the end of the first transmission opportunity 1052 allocated to the first electronic device 110-1. Again, a duration of the first transmission opportunity 1052 is pre-defined by the access point 112 and, therefore, even though the communications between the first electronic device 110-1 and the access point 112 are complete, the access point 112 waits until the start of the second transmission opportunity 1054 to send then second trigger frame 1014 to the second electronic device 110-2.

At the start of the second transmission opportunity 1054, the access point 112 transmits a second trigger frame 1014 to a second electronic device 110-2. In response to the second trigger frame 1014, the second electronic device 110-2 transmits a frame of HID data 1024 to the access point 112 after a specified delay. Upon receiving the frame of HID data 1024 and after the delay (e.g., SIFS), the access point 112 transmits an ACK frame 1036 to the second electronic device 110-2. Following the ACK frame 1036 and after a delay, the access point 112 transmits a frame of HAP data 1064 to the second electronic device 110-2. The second electronic device 110-2 then transmits an ACK frame 1038 to the access point 112. Again, the access point 112 waits until the start of subsequent transmission opportunities to send additional trigger frames to one or more additional electronic devices 110. Following all scheduled transmission opportunities, the access point 112 transmits a CF-END frame 1042 to indicate the end of the contention-free period.

It will be appreciated that the information identifying the pre-defined duration of the transmission opportunities can be supplied to the electronic devices 110 within the trigger frames. In some embodiments, the access point 112 populates or generates the fields of the trigger frame, including: a NAV value in the duration field 304 indicating the time remaining in the contention-free period, a value (e.g., timestamp) corresponding to the start of the current transmission opportunity in the base timestamp field 310, and a value (e.g., timestamp) corresponding to the end of the current transmission opportunity in the slot end timestamp field 312. The electronic device 110 can read these fields from the trigger frame to determine how much time is available to send data during the currently allocated transmission opportunity.

Figure 10B:
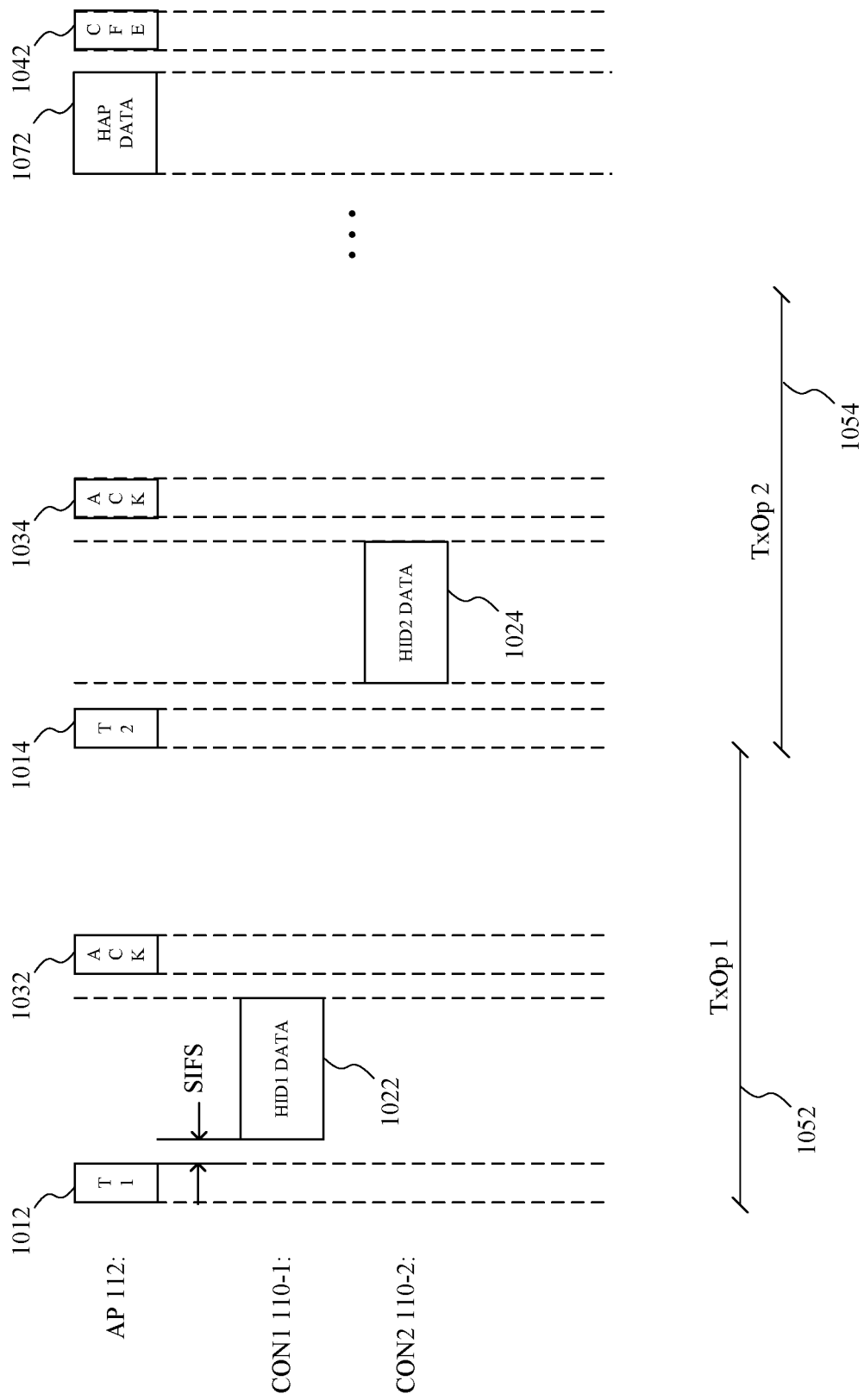
FIG. 10B illustrates a scheduled access mechanism, in accordance with other embodiments.

FIG. 10B illustrates a scheduled access mechanism, in accordance with other embodiments. Unlike in the scheduled access mechanism of FIG. 10A, the scheduled access mechanism of FIG. 10B transmits a frame of bulk HAP data 1072 to a number of electronic devices 110 at the end of the contention-free period. Consequently, the transmission opportunities are merely utilized for the electronic devices to transmit frames of HID data 1022, 1024, etc. to the access point 112. The feedback information included in the various frames of HAP data 1062, 1064, etc. transmitted to the corresponding electronic devices 110 can be queued and broadcast or multicast to a number of electronic devices 110 at the end of the contention-free period in the frame of bulk HAP data 1072. It will be appreciated that each of the electronic devices 110 does not need to transmit an ACK frame to the access point 112 when bulk HAP data is transmitted in a broadcast or multicast data frame at the end of the contention-free period.

In some embodiments, the electronic device 110 can adjust the payload included in the frame of HID data based on the duration of the transmission opportunity. For example, the size of the payload can be adjusted to fit within the transmission opportunity and allow the access point 112 to send an ACK frame and a frame of HAP data to the electronic device 110. Any truncated data can be queued or buffered to be transmitted during the next transmission opportunity. Alternatively, in some embodiments, the header for the frame of HID data can include a field that indicates the station has buffered data that needs to be sent such that the access point 112 can allocate an additional transmission opportunity to the electronic device 110 during the next contention-free period. For example, an additional transmission opportunity (e.g., two transmission opportunities) can be allocated to the same electronic device 110 during a subsequent contention-free period.

In other embodiments, the electronic device 110 can adjust a data rate associated with a fixed payload size to ensure that the frame of HID data can be transmitted within the currently allocated transmission opportunity. For example, the electronic device 110, can change the modulation and coding scheme (MCS) used to transmit the frame of HID data based on the duration of the transmission opportunity. The selected MCS can be set in the preamble or header of the frame using a code in a field of the preamble or header. Higher data rates will enable more data to be transmitted in a shorter duration of the transmission opportunity, but at the cost of potential interference causing a failure at the access point 112 to receive the frame of HID data. It will be appreciated that the algorithm for selecting the MCS based on the duration of the allocated transmission opportunity can take into consideration additional criteria such as: a size of the queued data to be encoded within the frame payload, whether one or more retries within the transmission opportunity are enabled or disabled, historical information related to the success or failure of previous frame transmissions, and the like.

It will also be appreciated that the delay between the ACK frame 1034 and the start of the second transmission opportunity 1054 represents an idle communications medium. Where the delay is significantly longer than the SIFS, stations of other WLANs using the same communications medium with a contention-based access mechanism such as CSMA/CA could transmit over the communications medium prior to the start of the next transmission opportunity allocated within the WLAN. In other words, there is no guarantee that the communications medium will be idle at the start of the second transmission opportunity when the delay between the ACK frame 1032 and the trigger frame 1014 is large. In such cases, the access point 112 delays the sending of the second trigger frame 1014 until the communications medium is idle for a minimum delay (e.g., the SIFS). In other words, the trigger frame 1014 can be delayed while waiting for traffic from other WLANs to finish transmission on the communications medium.

This delay is immaterial as long as the trigger frame is transmitted prior to the end of the current transmission opportunity and there is a sufficient amount of time left before the end of the transmission opportunity to transmit the required data. In some embodiments, if the trigger frame is received by the electronic device 110 and the electronic device 110 determines that the time between the trigger frame and the end of the transmission opportunity is smaller than a minimum time threshold to send data and/or receive data, then the electronic device 110 can ignore the trigger frame and wait for the next transmission opportunity to be allocated to the electronic device 110 by the access point 112.

Figure 11:
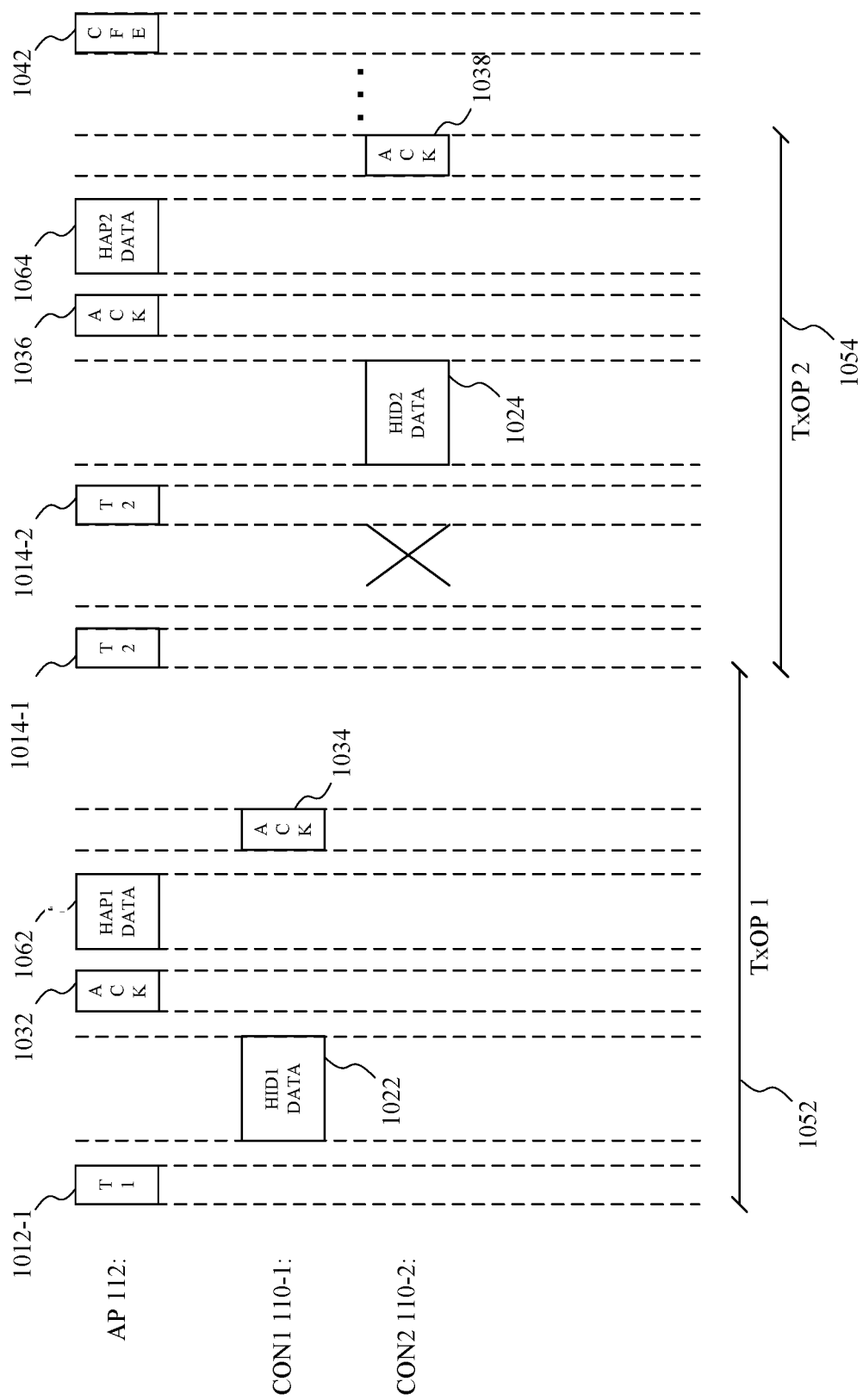
FIG. 11 illustrates a scheduled access mechanism with retries, in accordance with some embodiments.

FIG. 11 illustrates a scheduled access mechanism with retries, in accordance with some embodiments. In some embodiments, the access point 112 can be configured to perform a number of retries within a scheduled transmission opportunity when a particular electronic device 110 fails to respond to a trigger frame. As depicted in FIG. 11, the access point 112 can wait for a specified time after transmission of the trigger frame to receive a response from the electronic device 110. If a response (e.g., a frame of HID data) is not received within the specified time, then the access point 112 can attempt to re-transmit the trigger frame. In some cases, re-transmitting the trigger frame will result in receipt of the frame of HID data from the electronic device, at which point an ACK frame is transmitted to the electronic device 110. In other cases, re-transmitting the trigger frame will not result in the receipt of the frame of HID data from the electronic device, where no ACK frame is transmitted to the electronic device and, instead, a new trigger frame associated with a new transmission opportunity can be transmitted to a different electronic device 110. The trigger frame can be re-transmitted two or more times during a particular transmission opportunity.

In some embodiments, the individual stations can benefit from reduced power consumption when configured to communicate with the WLAN according to the aforementioned communication techniques. In such embodiments, the stations can advantageously enter a low-power mode during at least a portion of the contention-free period in order to save power.

In some embodiments, each trigger frame transmitted by the access point 112 includes a base timestamp field 310 that indicates the current value of the TSF maintained by the access point 112 corresponding with a time matching the generation of the trigger frame. The value in the base timestamp field 310 should be synchronized to a value of the TSF maintained by the electronic device 110. The trigger frames transmitted by the access point 112 also include an indication of the end of the current contention-free period, relative to the base timestamp field 310, in the duration field 304, an indication of the end of the current transmission opportunity in the slot end timestamp field 312, and an indication of a start of the next transmission opportunity allocated to the electronic device 110 during the next contention-free period in the next slot timestamp field 314. Consequently, each electronic device 110 can inspect these fields in a trigger frame to determine when the electronic device 110 can enter a low power mode.

For example, when a particular electronic device 110 is targeted by a trigger frame 300, such as by being listed first in the AID list field 320, that electronic device 110 can determine a time corresponding to the end of the transmission opportunity allocated to that electronic device 110 by inspecting the slot end timestamp field 312, relative to the base timestamp field 310. The electronic device 110 can then enter the low power mode when the current transmission opportunity expires. In addition, the electronic device 110 can determine a time corresponding to a next scheduled transmission opportunity allocated to the electronic device 110 by inspecting the next slot timestamp field 314, relative to the base timestamp field 310. The electronic device 110 can then set a wake up timer corresponding to the start of the next transmission opportunity allocated to the electronic device 110 during the next contention-free period. It will be appreciated that the scheduled access mechanism allows the electronic device 110 to spend more time in the low power mode than the unscheduled access mechanism because the access point 112 can indicate to the electronic device 110 during a current transmission opportunity when the next scheduled transmission opportunity in the next contention-free period is scheduled to occur. Thus, all electronic devices 110 do not need to wake at the start of the next contention-free period to listen for their trigger frame; instead, each electronic device 110 can wake at their expected transmission opportunity as previously scheduled by the access point 112. Again, in some embodiments, the low power mode includes disabling the radio 114 and/or signal processing circuitry associated with the physical layer of the WLAN.

Figure 12:
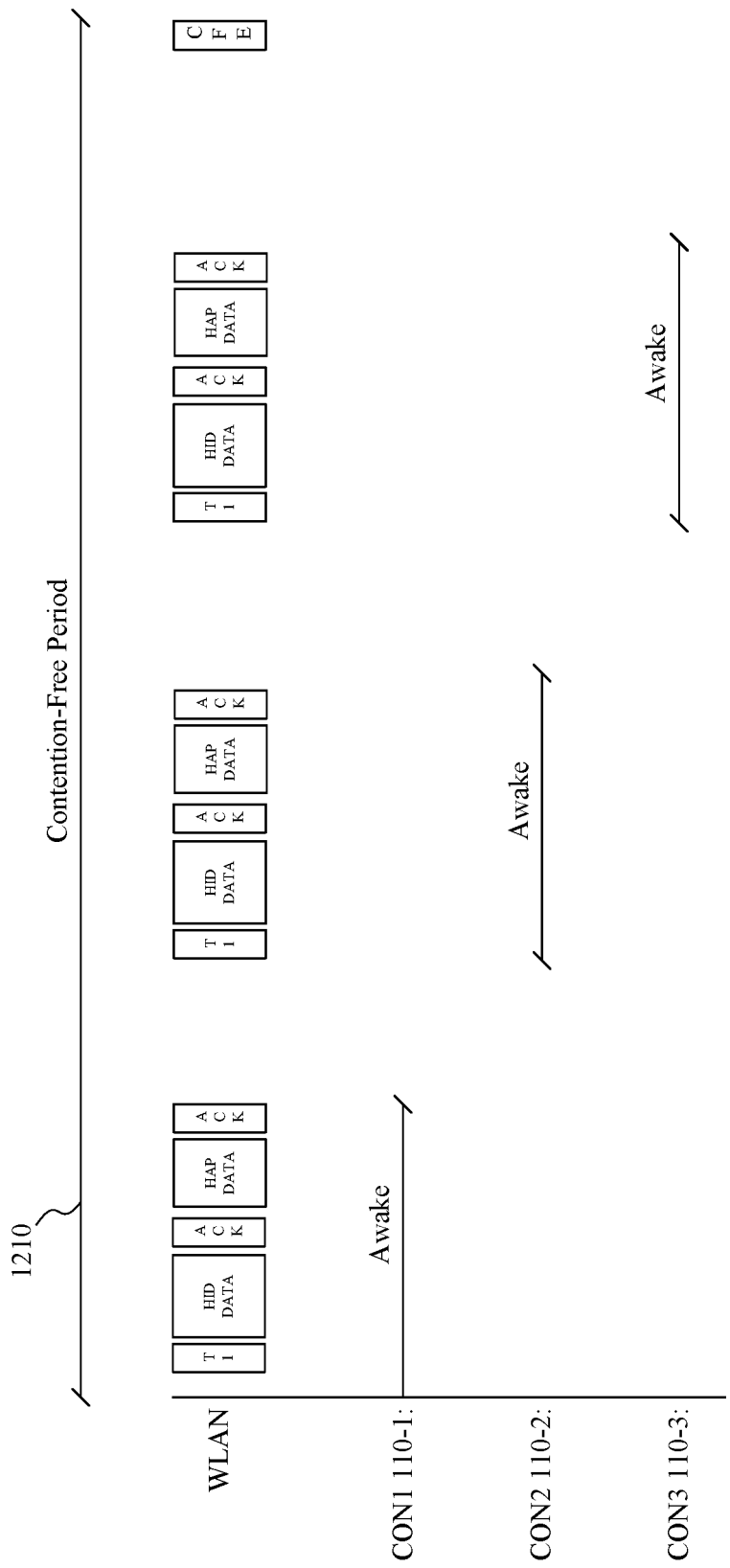
FIG. 12 illustrates a sleep cycle for a number of electronic devices utilizing the scheduled access mechanism to communicate via the WLAN, in accordance with some embodiments.

FIG. 12 illustrates a sleep cycle for a number of electronic devices utilizing the scheduled access mechanism to communicate via the WLAN, in accordance with some embodiments. Each electronic device 110 connected to the WLAN can wake up at the beginning of a corresponding transmission opportunity and listen to the communications medium to receive a trigger frame targeted to that electronic device 110. It will be appreciated that, prior to the first contention-free period after the electronic device 110 connects to the WLAN, the electronic device 110 will be awake and is configured to listen for a trigger frame targeted at the electronic device 110. That trigger frame includes information that specifies the next transmission opportunity for that electronic device 110, enabling the electronic device 110 to enter the low power mode between transmission opportunities.

As depicted in FIG. 12, at the beginning of the contention-free period 1210, a first trigger frame 1012, transmitted by the access point 112, allocates a first transmission opportunity to a first electronic device 110-1. The first electronic device 110-1 responds to the first trigger frame 1012 by transmitting a frame of HID data 1022 to the access point 112. The access point 112 then transmits an ACK frame 1032 to the first electronic device 110-1 followed by a frame of HAP data 1062. The first electronic device 110-1 then transmits an ACK frame 1034 to the access point 112. Once all of the data has been transmitted and received during the transmission opportunity, the first electronic device 110-1 can enter a low power mode, sometimes referred to as a sleep mode. Prior to entering the low power mode, the first electronic device 110-1 can calculate a wake up time, relative to a value of the TSF of the first electronic device 110-1, corresponding to the start of the next transmission opportunity allocated to the first electronic device 110-1. The first electronic device 110-1 can be configured to exit the low power mode at or prior to the wake up time. In some embodiments, the electronic device 110 can set a wake-up timer based on the time that corresponds to a start of a corresponding transmission opportunity allocated to the electronic device during the subsequent contention-free period as indicated by the next slot timestamp field 314 included in the trigger frame.

At some point between the end of the first transmission opportunity and prior to transmission of a second trigger frame 1014 during a second transmission opportunity, a second electronic device 110-2 wakes up and resumes listening to the communications medium. A second trigger frame 1014, transmitted by the access point 112, allocates a second transmission opportunity to the second electronic device 110-2. The second electronic device 110-2 responds to the second trigger frame 1014 by transmitting a frame of HID data 1024 to the access point 112. The access point 112 then transmits an ACK frame 1036 to the second electronic device 110-2 followed by a frame of HAP data 1064. The second electronic device 110-2 then transmits an ACK frame 1038 to the access point 112 Once the second transmission opportunity is concluded, the second electronic device 110-1 can enter the low power mode. Prior to entering the low power mode, the second electronic device 110-2 can calculate a wake up time, relative to a value of the TSF of the second electronic device 110-2, corresponding to the start of the next transmission opportunity allocated to the second electronic device 110-2. The second electronic device 110-2 can be configured to exit the low power mode at or prior to the wake up time.

It will be appreciated that the first electronic device 110-1 and the second electronic device 110-2 are not configured to wake up at the same time, like in the sleep cycle for the unscheduled access mechanism as illustrated in FIG. 9. Consequently, the ratio of an awake period to a sleep period for each electronic device 110 can be reduced compared to the sleep cycle for the unscheduled access mechanism, thereby saving more power at the electronic device 110.

In some embodiments, the electronic device 110 can be configured to enter the low power mode immediately after the ACK frame in response to the frame of HAP data is transmitted to the access point 112 by the electronic device 110, even if there is still time remaining during the current transmission opportunity. In some embodiments, the electronic device 110 can be configured to wake up prior to the start of the next allocated transmission opportunity to ensure that the electronic device 110 does not miss the start of the next trigger frame 300 targeted at the electronic device 110. For example, the wake up timer can be set to expire 50 microseconds ahead of the scheduled start of the next transmission opportunity.

In some embodiments, the slot end timestamp field 312 and the next slot timestamp field 314 include values relative to the beginning of the contention-free period 1210. Thus, each electronic device 110 can only identify a wake up time for a particular transmission opportunity within the current contention-free period once the start time for the contention-free period is identified. In such cases, all electronic devices 110 are configured to wake up and listen to the communications medium for a short time to identify the beginning of the contention-free period, and then all but one electronic device 110 allocated the first transmission opportunity can enter the low power mode and wait until a start of a corresponding transmission opportunity within the contention-free period. This type of operation can be important when the start of the contention-free period can be delayed while contending for access to the communications medium with other WLANs.

Figure 13:
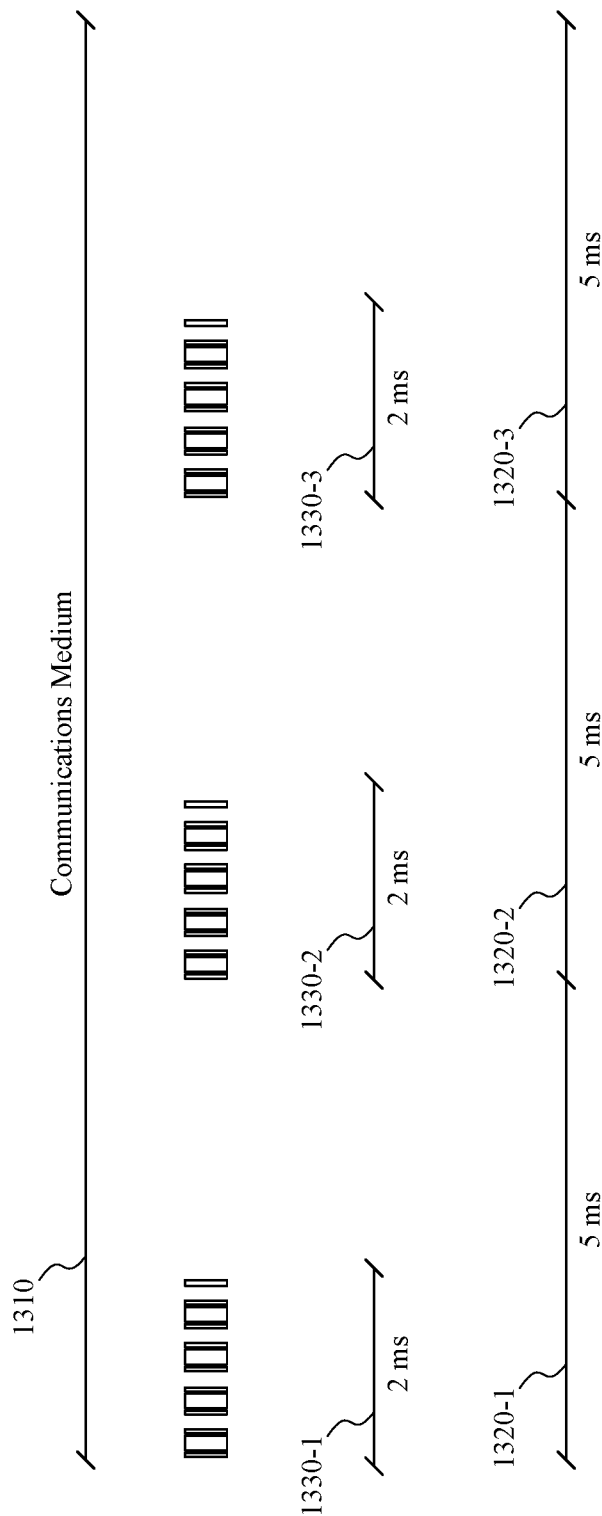
FIG. 13 illustrates access to the communications medium by multiple WLANs, in accordance with some embodiments.

FIG. 13 illustrates access to the communications medium by multiple WLANs, in accordance with some embodiments. As described above, at least some of the communications techniques can monopolize the communications medium over legacy contention-based access mechanisms where the delay between frames transmitted over the communications medium is too short for the contention-based access algorithms to acquire a transmission opportunity. This is an intentional choice by utilizing the SIFS (e.g., 16 microseconds) as the selected delay between frames and then immediately transmitting another frame, thereby not enabling, e.g., legacy Wi-Fi stations to reach a particular random back-off slot. However, where the communications medium is shared among multiple WLANs, some using the techniques described herein and others using legacy communications protocols, care should be taken to ensure shared access to the communications medium.

One technique for sharing access to the communications medium can be inherent simply based on the selection of the duration of the contention-free period and the number of transmission opportunities allocated therein. For example, if long duration contention-free periods are specified by the WLAN (e.g., 10 ms), and a small number of electronic devices 110 are connected to the WLAN (e.g., 4 devices), then each electronic device 110 can be allocated a long duration for a particular transmission opportunity (e.g., 2.5 ms). The natural effect of a long duration for each transmission opportunity is that the electronic device 110 can finish transmission very early in the transmission opportunity, allowing other WLAN stations in other WLANs to utilize the communications medium prior to the start of the next transmission opportunity within the contention-free period. For example, transmission of data between an electronic device 110 and the access point 112 could be complete in 200 microseconds, leaving 2.3 ms in the transmission opportunity to be utilized by other WLANs to transmit data over the communications medium.

Another technique for sharing access to the communications medium can be implemented by adjusting the duty cycle of contention-free periods associated with the WLAN to contention-based periods associated with other WLANs. As depicted in FIG. 13, the communications medium 1310 can be divided into time slices 1320 at a particular frequency. Each time slice 1320 can include a contention-free period 1330 that provides access to the communications medium 1310 for the WLAN. A duration of the contention-free period 1330 is less than a duration of the time slice 1320, enabling other WLANs to access the communications medium 1310 outside of the contention-free period 1330.

By way of example as depicted in FIG. 13, the access point 112 can be configured to divide the communications medium 1310 into time slices 1320 at a frequency of, e.g., 200 Hz. Each time slice 1320 is therefore 5 ms in duration. Within each time slice 1320, the access point 112 can allocate resource units (e.g., transmission opportunities) to electronic devices 110 connected to the WLAN within a contention-free period 1330 having a duration of, e.g., 2 ms, leaving 3 ms of time in the time slice 1320 for other WLANs to contend for access to the communications medium. Three time slices 1320-1, 1320-2, and 1320-3 are shown in FIG. 13 as well as three corresponding contention-free periods 1330-1, 1330-2, and 1330-3.

In some embodiments, the access point 112 utilizes contention-based access mechanisms to get access to the communications medium 1310 from other WLANs. For example, the access point 112 can implement carrier sense techniques to determine when the communications medium 1310 is idle. The access point 112 can wait for the communications medium 1310 to be idle for a specified delay (e.g., SIFS) before beginning the contention-free period 1330. However, once the access point 112 has acquired the communications medium 1310, the contention-free period 1330 can allow unfettered access to the communications medium 1310 for the remainder of the contention-free period 1330 assuming transmissions continue unabated via the WLAN with minimal delays in between frames.

Nevertheless, it will be appreciated that utilization of these communications techniques can negatively affect other wireless communications protocols contending for the same channels. Therefore, in some embodiments the access point 112 is configured to exhibit "good neighbor" behavior that attempts to reduce interference with other wireless communications.

Figure 14:
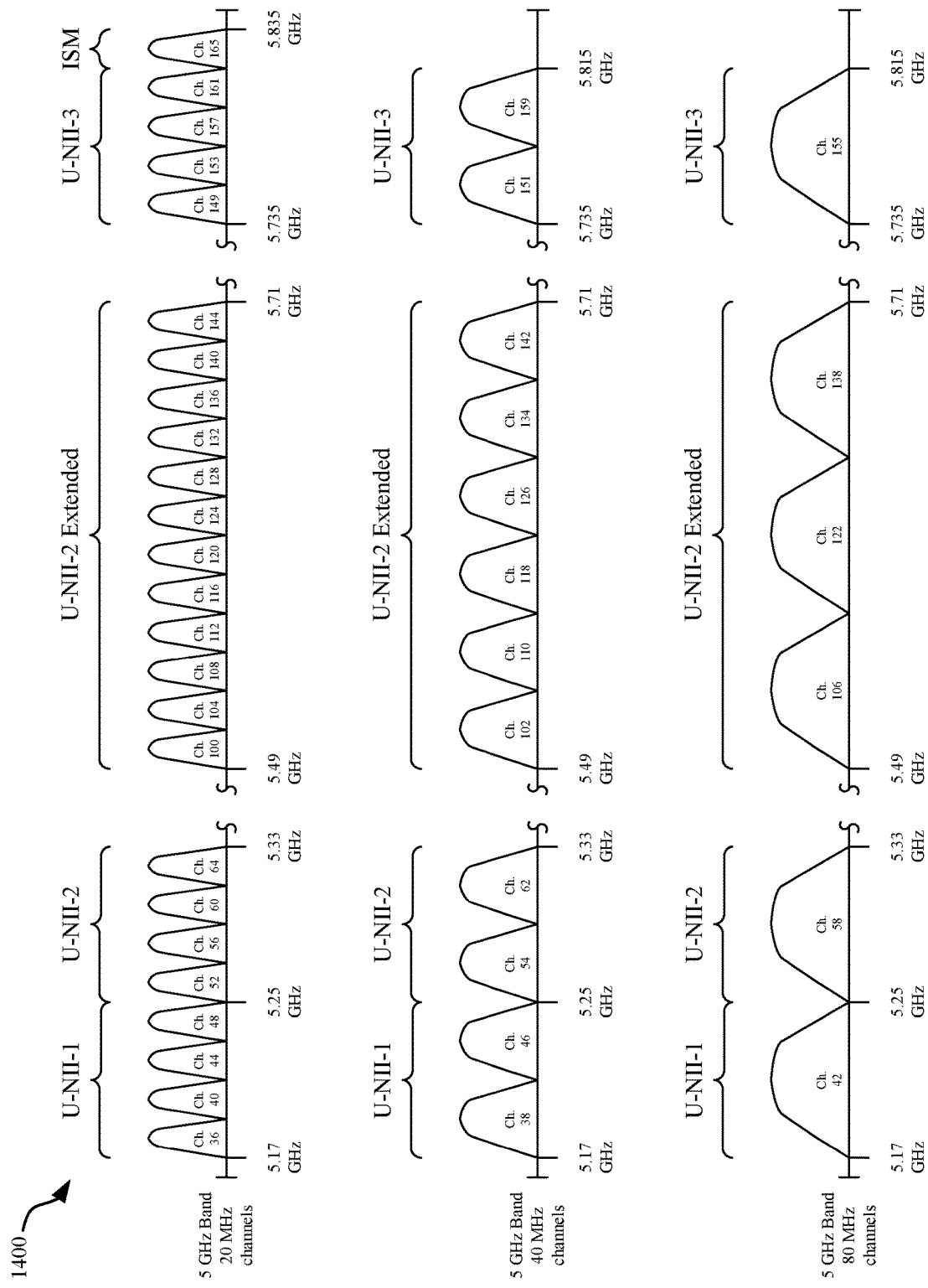
FIG. 14 is a chart that depicts a portion of the 5 GHz RF spectrum, in accordance with some embodiments.

FIG. 14 is a chart 1400 that depicts a portion of the 5 GHz RF spectrum, in accordance with some embodiments. The 5 GHz RF spectrum has been reserved for unlicensed use by, e.g., personal wireless communications systems such as wireless antennas associated with the stations of the WLAN. The 5 GHz RF spectrum is divided into a number of channels having center frequencies spaced 5 MHz apart. The WLAN can operate on one or more channels within the 5 GHz RF spectrum.

As depicted in FIG. 14, the 5 GHz RF spectrum is divided into a number of channels. Four distinct ranges of frequencies within the 5 GHz RF spectrum can be referred to as part of the Unlicensed National Information Infrastructure (U-NII) radio band. U-NII-1 operates on frequencies between 5.170 and 5.250 GHz; U-NII-2 operates on frequencies between 5.250 GHz and 5.330 GHz; U-NII-2-Extended operates on frequencies between 5.490 GHz and 5.710 GHz; and U-NII-3 operates on frequencies between 5.735 GHz and 5.815 GHz. Each of the channels is 20 MHz, 40 MHz, or 80 MHz wide and is centered on a center frequency associated with the channel number. For example, U-NII-1 includes four 20 MHz wide channels: Channel 36, Channel 40, Channel 44, and Channel 48. U-MI-1 also includes two 40 MHz wide channels: Channel 38 and Channel 46. Furthermore, U-NII-1 includes one 80 MHz wide channel: Channel 42.

In some embodiments, the access point 112 is configured to select an optimum channel for communication between stations connected to the WLAN. During setup, the access point 112 can monitor the RF spectrum in order to determine the optimum channel. For example, in some embodiments, the access point 112 configures a radio 114 for a particular channel. The access point 112 then measures a power associated with that channel over a period of time, generating a signal metric for the channel. In some embodiments, the signal metric is a received signal strength metric. In other embodiments, the signal metric is a noise metric.

The access point 112 can re-configure the radio 114 to receive signals on a different channel and to measure a power associated with that channel. After a period of time, the access point 112 collects the signal metric for a subset of channels within the 5 GHz RF spectrum and determines which channel is an optimum channel based on criteria. The criteria can be based, at least in part, on the collection of signal metrics collected for the one or more channels. In some embodiments, the access point 112 selects a channel with a minimum received signal strength metric value as the optimum channel. It will be appreciated that a low received signal strength metric value indicates that the channel is likely to exhibit less interference from RF sources external to the WLAN compared to other channels.

For example, the access point 112 can measure the power associated with each channel and determine that Channel 104 is the optimum channel. The access point 112 then configures the radio 114 to use Channel 104. As the access point 112 receives requests to connect to the WLAN from one or more electronic devices 110, the access point 112 transmits P2P information to the electronic devices 110 that includes information that indicates the WLAN is configured to use Channel 104.

In some embodiments, the access point 112 selects the optimum channel based on a combination of multiple criteria. For example, the access point 112 can select an optimum channel based, at least in part, on a number of electronic devices 110 connected to the WLAN. The access point 112 can select a 40 MHz wide or an 80 MHz wide channel instead of a 20 MHz channel based on the number of electronic devices 110 connected to the WLAN. In some embodiments, a weight can be applied to the collection of signal metrics for the channels, where the weight applied to a particular signal metric is based on the number of electronic devices 110 connected to the WLAN and a width of the channel (e.g., 20 MHz, 40 MHz, 80 MHz, etc.).

In some embodiments, the access point 112 monitors the selected channel utilized by the WLAN periodically. For example, the access point 112 can be configured to scan the channels in the 5 GHz RF spectrum during the contention-period while the WLAN is idle in between contention-free periods. The access point 112 is configured to detect neighboring networks and other RF sources that interfere with the communications of the WLAN on the selected channel. In some embodiments, if the amount of interference on the selected channel is above a threshold value, as indicated by comparing the signal metric value to a threshold value, then the access point 112 determines if there is a better channel available and re-configures the WLAN to use the better channel. A better channel can be defined as a channel having a lower signal metric value that indicates that there is less interference on that channel compared to a signal metric value for the selected channel.

In some embodiments, the access point 112 is configured to utilize one or more electronic devices 110 connected to the WLAN to assist with the detection, which can be referred to as collaborative spectrum monitoring. It will be appreciated that the RF interference in one location will be different than the RF interference in another location. Even though RF interference on a particular channel is high as measured by the access point 112, the RF interference on that particular channel can be lower for one or more of the electronic devices 110 located in a different location. Similarly, even though the RF interference on a different channel can be low as measured by the access point 112, the RF interference on that different channel can be high at one or more electronic devices 110.

The access point 112 can request each of one or more electronic devices 110 connected to the WLAN to collect channel information for a number of channels. The channel information can include signal metric values for a number of channels as measured by the electronic device 110. The electronic devices 110 can transmit the collected channel information to the access point 112, which aggregates the collected channel information from one or more electronic devices 110 as well as channel information collected by the access point 112. In some embodiments, the access point 112 can calculate a mean signal metric value for each of a plurality of channels. In other words, the access point 112 can calculate a mean value measured by different devices for a particular signal metric for a channel as the aggregate signal metric value for the channel. The aggregate signal metric values can then be used when determining whether to switch channels. This collaborative spectrum monitoring algorithm attempts to select an optimum channel for all devices connected to the WLAN rather than simply the optimum channel for the access point 112.

In other embodiments, the access point 112 can perform a statistical analysis of the channel information collected from multiple sources when selecting the new channel. For example, the access point 112 can determine the variance associated with a plurality of data points for a given signal metric from a plurality of electronic devices 110. The statistical values can be utilized in a calculation to determine the optimum channel.

In some embodiments, the access point 112 is configured to prioritize the use of radar channels for the WLAN. The radar channels are those channels in the U-NII-2 and U-NII-2-Extended radio bands (e.g., 5.250 GHz-5.710 GHz). These channels can be referred to as Dynamic Frequency Selection (DFS) channels because regulations require transmitters on these channels to monitor the channel for interference and switch channels to avoid interference with radar systems that also use these channels. In some embodiments, the access point 112 can multiply the signal metric values by a weight in order to prioritize selection of the DFS channels over channels outside these radio bands. In other embodiments, the access point 112 can select a channel in the radar channels over another channel as the optimum channel when the difference between the signal metric values is below a threshold value. In other words, if the interference on a channel outside the radar channels is less than the interference on a radar channel, but only by a marginal amount less than a threshold value, then the access point 112 can select the radar channel over the non-radar channel. It will be appreciated that the radar channel may not be selected in certain cases in order to adhere to regulations that govern these channels.

In some embodiments, the access point 112 can also implement a closed loop transmission power control algorithm. In some cases, an electronic device 110 may be located in close proximity to the access point 112. In such cases, the received signal strength of wireless signals transmitted from that electronic device 110 to the access point 112 can be very strong and be associated with a high signal-to-noise ratio (SNR). The power of the transmitter in the electronic device 110 can be reduced so that the transmitted signals do not interfere with other RF antennas within range of the electronic device 110.

In some embodiments, the access point 112 is configured to periodically transmit a control frame to the electronic device 110 that causes the electronic device 110 to adjust a power associated with the transmitted signals generated by the radio 114 of the electronic device 110. The access point 112 can measure the SNR of a wireless signal received from the electronic device 110, and adjust a target transmitter power value associated with the electronic device 110 based on the measured SNR. The target transmitter power is adjusted using a closed loop control algorithm to make the measured SNR track a target SNR. In other embodiments, the access point 112 is configured to adjust the transmit power of the electronic device 110 using other control schemes, which can be based on other measured metrics. For example, the access point 112 can adjust the transmitter power of electronic devices 110 to attempt to normalize the received signal strength from two or more electronic devices 110 rather than track a target SNR. In some embodiments, the access point 112 only negotiates reduced transmitter power responsive to detecting interference above a threshold level (e.g., as measured by SNR or some other noise metric). In other words, the electronic devices 110 can transmit at full power while the channel is uncongested. However, once the access point 112 detects interference on the channel, the access point 112 can instruct one or more electronic devices 110 to decrease a power of their corresponding transmitters in order to attempt to reduce interference from those electronic devices 110 with other RF devices.

The above techniques are useful in reducing a disruption caused by the WLAN on other WLANs or other RF devices in proximity to the access point 112 and/or the electronic device 110.

Figure 15:
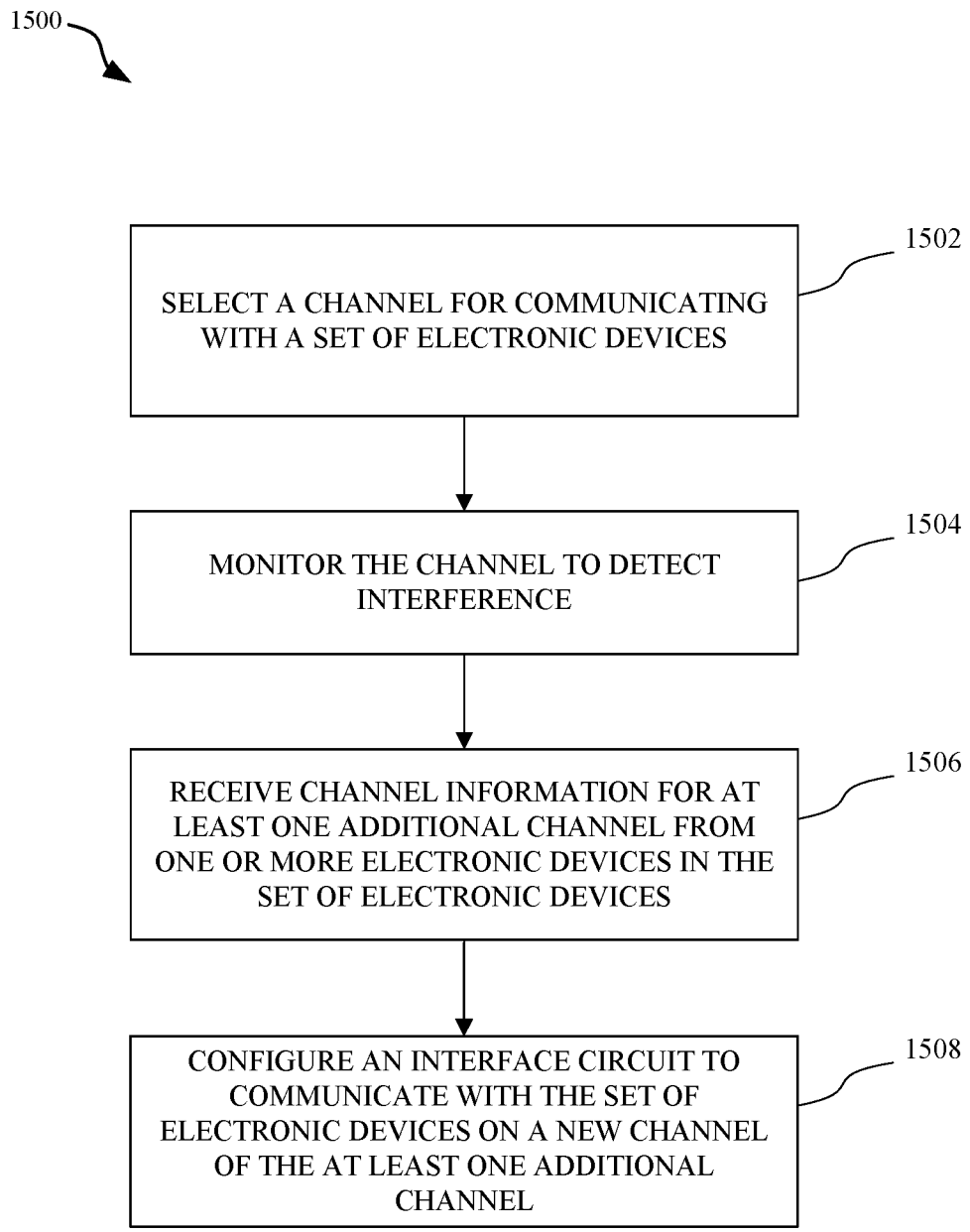
FIG. 15 presents a flow diagram illustrating an exemplary method for monitoring a radio frequency spectrum and adjusting a mode of communication of the WLAN, in accordance with some embodiments.

FIG. 15 presents a flow diagram 1500 illustrating an exemplary method for monitoring a radio frequency spectrum and adjusting a mode of communication of the WLAN, in accordance with some embodiments. This method can be performed by one or more components included in an access point (and, more generally, an electronic device), such as an interface circuit and/or a processing subsystem in access point 112 in FIG. 1.

At 1502, a channel is selected for communicating with a set of electronic devices. In some embodiments, a processing subsystem of the access point is configured to cause the access point to select an optimum channel based on signal metrics measured for that channel as well as one or more additional channels. The processing subsystem can configure an interface circuit of the access point, which is communicatively coupled to one or more nodes coupled to an antenna, to communicate (e.g., transmit and/or receive) on the selected channel. In some embodiments, the channel is a channel in a 5 GHz RF spectrum having a center frequency between 5.170 GHz and 5.835 GHz.

At 1504, the channel is monitored to detect interference from radio frequency sources not connected to the WLAN. In some embodiments, the access point monitors the channel by measuring a power associated with the channel during a contention period where the WLAN is idle. The processing subsystem can analyze wireless signals to calculate a signal metric for the channel. The signal metric can be compared against a threshold value to detect a level of the interference.

At 1506, channel information for at least one additional channel associated with the communications medium is received from one or more electronic devices. Each electronic device in a set of electronic devices can perform monitoring operations to measure wireless signals on the additional channels and calculate signal metrics associated with those channels. The electronic devices then transmit the channel information to the access point.

At 1508, the interface circuit of the access point is configured to communicate with the set of electronic devices on a new channel of the at least one additional channel. In some embodiments, the access point analyzes the channel information to select an optimum channel from the at least one additional channel that is better than the current channel used for communications within the WLAN.

Figure 16:
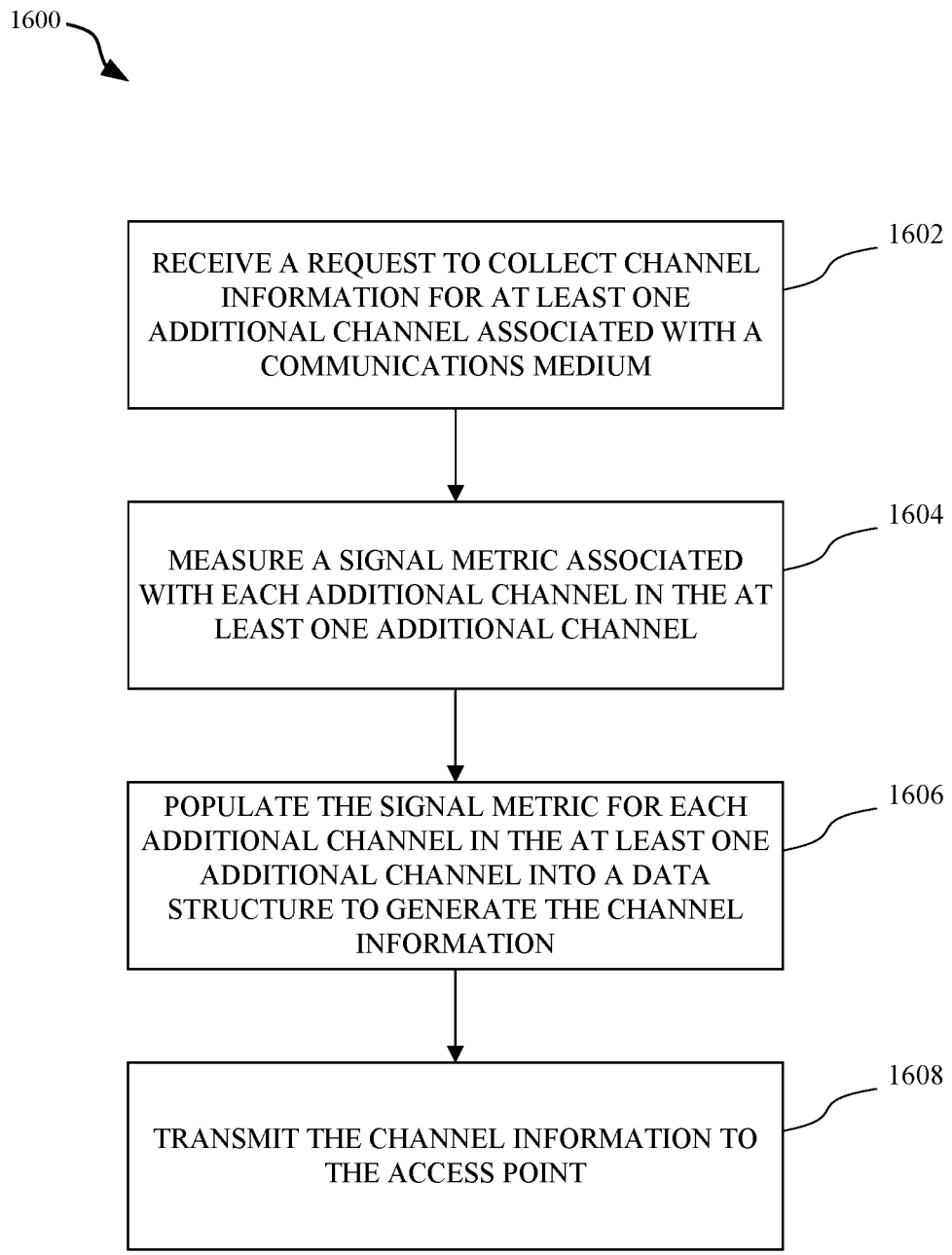
FIG. 16 presents a flow diagram illustrating an exemplary method for collecting channel information associated with a communications medium, in accordance with some embodiments.

FIG. 16 presents a flow diagram 1600 illustrating an exemplary method for collecting channel information associated with a communications medium, in accordance with some embodiments. This method can be performed by one or more components included in a station (and, more generally, an electronic device), such as an interface circuit and/or a processing subsystem in electronic device 110 in FIG. 1.

At 1602, a request is received from the access point to collect channel information for at least one additional channel associated with the communications medium. In some embodiments, the request can be communicated via the WLAN in a control frame. For example, a flag can be set in a control frame, such as a trigger frame, that causes the electronic device to monitor the RF spectrum and report channel information to the access point. In other embodiments, the request can be received via a WPAN.

At 1604, a signal metric is measured for each channel in the at least one additional channel. In some embodiments, the signal metric can be a received signal strength metric. In other embodiments, the signal metric can be a noise metric that measures a power of the wireless signal on the channel while the channel is idle during a contention period.

At 1606, the signal metric for each additional channel is populated into a data structure to generate the channel information. The electronic device can store the data structure in a memory subsystem and update the data structure over a period of time for a number of channels in the at least one additional channel.

At 1608, the channel information is transmitted to the access point. In some embodiments, the electronic device transmits the channel information to the access point in a data frame via the WLAN. In other embodiments, the channel information is transmitted to the access point via a WPAN.

Figure 17:
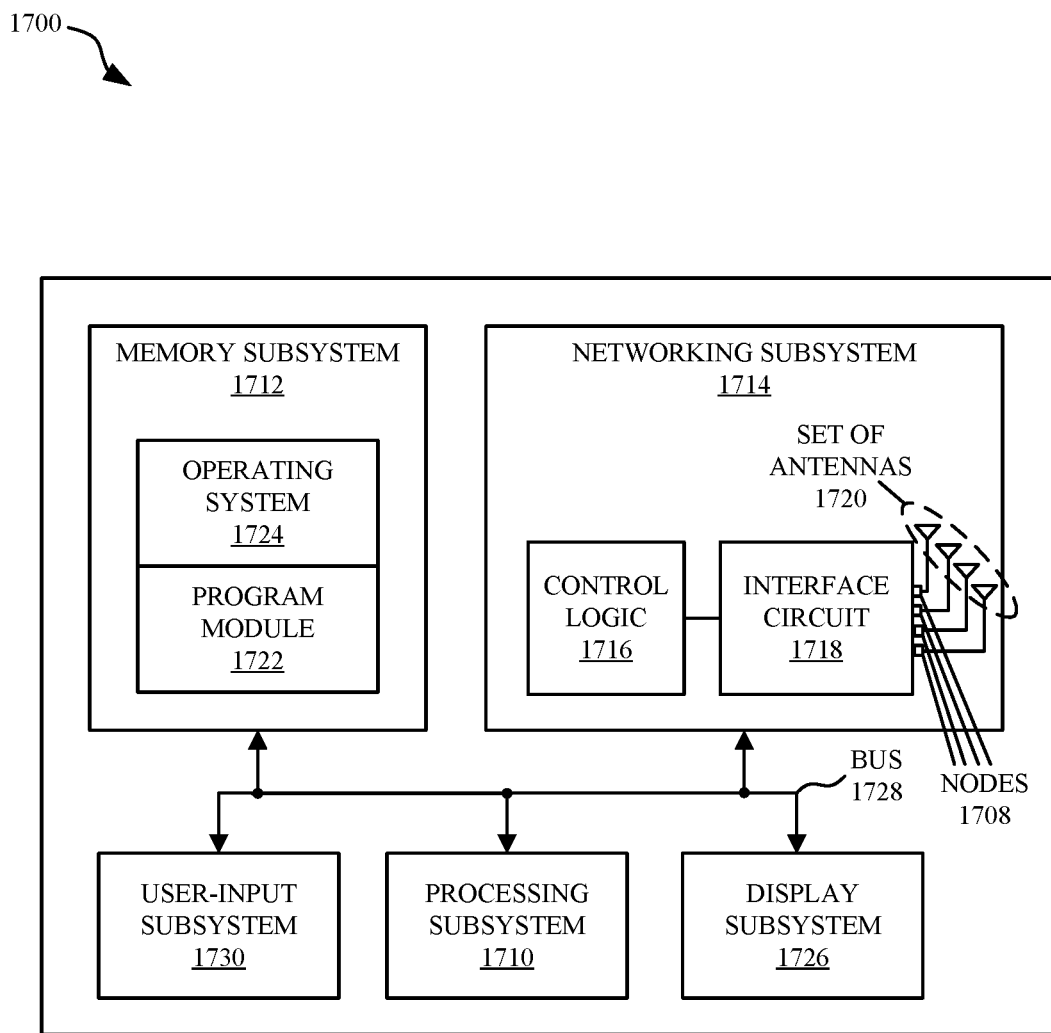
FIG. 17 presents a block diagram of an electronic device in accordance with some embodiments.

FIG. 17 presents a block diagram of an electronic device 1700 (which can be an access point, another electronic device, such as a station or a legacy electronic device) in accordance with some embodiments. This electronic device includes processing subsystem 1710, memory subsystem 1712, and networking subsystem 1714. Processing subsystem 1710 includes one or more devices configured to perform computational operations. For example, processing subsystem 1710 can include one or more microprocessors, application-specific integrated circuits (ASICs), microcontrollers, programmable-logic devices, and/or one or more digital signal processors (DSPs).

Memory subsystem 1712 includes one or more devices for storing data and/or instructions for processing subsystem 1710 and networking subsystem 1714. For example, memory subsystem 1712 can include dynamic random access memory (DRAM), static random access memory (SRAM), a read-only memory (ROM), flash memory, and/or other types of memory. In some embodiments, instructions for processing subsystem 1710 in memory subsystem 1712 include: one or more program modules or sets of instructions (such as program module 1722 or operating system 1724), which can be executed by processing subsystem 1710. For example, a ROM can store programs, utilities or processes to be executed in a non-volatile manner, and DRAM can provide volatile data storage, and can store instructions related to the operation of electronic device 1700. Note that the one or more computer programs can constitute a computer-program mechanism, a computer-readable storage medium or software. Moreover, instructions in the various modules in memory subsystem 1712 can be implemented in: a high-level procedural language, an object-oriented programming language, and/or in an assembly or machine language. Furthermore, the programming language can be compiled or interpreted, e.g., configurable or configured (which can be used interchangeably in this discussion), to be executed by processing subsystem 1710. In some embodiments, the one or more computer programs are distributed over a network-coupled computer system so that the one or more computer programs are stored and executed in a distributed manner.

In addition, memory subsystem 1712 can include mechanisms for controlling access to the memory. In some embodiments, memory subsystem 1712 includes a memory hierarchy that comprises one or more caches coupled to a memory in electronic device 1700. In some of these embodiments, one or more of the caches is located in processing subsystem 1710.

In some embodiments, memory subsystem 1712 is coupled to one or more high-capacity mass-storage devices (not shown). For example, memory subsystem 1712 can be coupled to a magnetic or optical drive, a solid-state drive, or another type of mass-storage device. In these embodiments, memory subsystem 1712 can be used by electronic device 1700 as fast-access storage for often-used data, while the mass-storage device is used to store less frequently used data.

Networking subsystem 1714 includes one or more devices configured to couple to and communicate on a wired and/or wireless network (i.e., to perform network operations), including: control logic 1716, an interface circuit 1718 and a set of antennas 1720 (or antenna elements) in an adaptive array that can be selectively turned on and/or off by control logic 1716 to create a variety of optional antenna patterns or 'beam patterns.' (While FIG. 17 includes set of antennas 1720, in some embodiments electronic device 1700 includes one or more nodes, such as nodes 1708, e.g., a pad, which can be coupled to set of antennas 1720.) For example, networking subsystem 1714 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a WiFi® networking system), an Ethernet networking system, and/or another networking system.

Networking subsystem 1714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1700 can use the mechanisms in networking subsystem 1714 for performing simple wireless communication between the electronic devices, e.g., transmitting advertising or beacon frames and/or scanning for advertising frames transmitted by other electronic devices.

Within electronic device 1700, processing subsystem 1710, memory subsystem 1712, and networking subsystem 1714 are coupled together using bus 1728 that facilitates data transfer between these components. Bus 1728 can include an electrical, optical, and/or electro-optical connection that the subsystems can use to communicate commands and data among one another. Although only one bus 1728 is shown for clarity, different embodiments can include a different number or configuration of electrical, optical, and/or electro-optical connections among the subsystems.

In some embodiments, electronic device 1700 includes a display subsystem 1726 for displaying information on a display, which can include a display driver and the display, such as a liquid-crystal display, a multi-touch touchscreen, etc. Display subsystem 1726 can be controlled by processing subsystem 1710 to display information to a user (e.g., information relating to incoming, outgoing, or an active communication session).

Electronic device 1700 can also include a user-input subsystem 1730 that allows a user of the electronic device 1700 to interact with electronic device 1700. For example, user-input subsystem 1730 can take a variety of forms, such as: a button, keypad, dial, touch screen, audio input interface, visual/image capture input interface, input in the form of sensor data, etc.

Electronic device 1700 can be (or can be included in) any electronic device with at least one network interface. For example, electronic device 1700 can include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1700, in alternative embodiments, different components and/or subsystems can be present in electronic device 1700. For example, electronic device 1700 can include one or more additional processing subsystems, memory subsystems, networking subsystems, and/or display subsystems. Additionally, one or more of the subsystems can be omitted in electronic device 1700. Moreover, in some embodiments, electronic device 1700 can include one or more additional subsystems that are not shown in FIG. 17. Also, although separate subsystems are shown in FIG. 17, in some embodiments some or all of a given subsystem or component can be integrated into one or more of the other subsystems or component(s) in electronic device 1700. For example, in some embodiments program module 1722 is included in operating system 1724 and/or control logic 1716 is included in interface circuit 1718.

Moreover, the circuits and components in electronic device 1700 can be implemented using any combination of analog and/or digital circuitry, including: bipolar, PMOS and/or NMOS gates or transistors. Furthermore, signals in these embodiments can include digital signals that have approximately discrete values and/or analog signals that have continuous values. Additionally, components and circuits can be single-ended or differential, and power supplies can be unipolar or bipolar.

An integrated circuit (which is sometimes referred to as a 'communication circuit') can implement some or all of the functionality of networking subsystem 1714. This integrated circuit can include hardware and/or software mechanisms that are used for transmitting wireless signals from electronic device 1700 and receiving signals at electronic device 1700 from other electronic devices. Aside from the mechanisms herein described, radios are generally known in the art and hence are not described in detail. In general, networking subsystem 1714 and/or the integrated circuit can include any number of radios. Note that the radios in multiple-radio embodiments function in a similar way to the described single-radio embodiments.

In some embodiments, networking subsystem 1714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein can be a computer-readable medium such as, for example, a magnetic tape or an optical or magnetic disk. The computer-readable medium can be encoded with data structures or other information describing circuitry that can be physically instantiated as the integrated circuit or the portion of the integrated circuit. Although various formats can be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques can be used. Thus, the communication technique can be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments can be performed in hardware, in software or both. For example, at least some of the operations in the communication technique can be implemented using program module 1722, operating system 1724 (such as a driver for interface circuit 1718) or in firmware in interface circuit 1718. Alternatively or additionally, at least some of the operations in the communication technique can be implemented in a physical layer, such as hardware in interface circuit 1718. In some embodiments, the communication technique is implemented, at least in part, in a MAC layer and/or in a physical layer in interface circuit 1718.

Furthermore, in general, the communication technique can be used to facilitate scheduled channel access in time and/or frequency in conjunction with multi-user multiple input multiple output (MU-MIMO) and/or orthogonal frequency-division multiple access (OFDMA).

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An access point, comprising:
one or more nodes configured to communicatively couple to an antenna;
an interface circuit, communicatively coupled to the one or more nodes, configured to communicate with a set of electronic devices in a wireless local area network (WLAN); and
a processing subsystem, communicatively coupled to the interface circuit, configured to cause the access point to:
select a channel associated with a communications medium for communicating with the set of electronic devices;
monitor the channel to detect interference from radio frequency (RF) sources not connected to the WLAN;
receive channel information for at least one additional channel associated with the communications medium from one or more electronic devices in the set of electronic devices; and
configure the interface circuit to communicate with the set of electronic devices on a new channel of the at least one additional channel,
wherein:
the access point communicates with the one or more electronic devices via scheduled communication during contention-free periods separated by quiet periods to share the communications medium with other WLANs; and
the one or more electronic devices each select a modulation and coding scheme (MCS) to use to transmit uplink data to the access point during a respective allocated transmission opportunity based on a duration of the transmission opportunity and historical information related to success or failure of previous transmissions.

2. The access point of claim 1, wherein:
the channel information comprises a signal metric measured by a particular electronic device in the one or more electronic devices for each channel in the at least one additional channel;
the new channel is selected based on a comparison of the signal metric for the new channel with a corresponding signal metric for the channel; and
the signal metric for a particular channel is weighted based on whether the particular channel is associated with a center frequency in a range of 5.250 gigahertz (GHz) to 5.710 GHz.

3. The access point of claim 1, wherein the one or more electronic devices each select the MCS further based on a size of queued data to be encoded with a frame payload.

4. The access point of claim 1, wherein the one or more electronic devices each select the MCS further based on whether one or more retries with the transmission opportunity are enabled or disabled.

5. The access point of claim 1, wherein the interface circuit is configured to transmit a wireless signal to the set of electronic devices that causes each electronic device to configure a radio to operate on the new channel.

6. The access point of claim 5, wherein the wireless signal is sent via a connection established via a wireless personal area network (WPAN).

7. The access point of claim 1, wherein the processing subsystem is further configured to cause the access point to:
transmit a wireless signal to a particular electronic device in the set of electronic devices, the wireless signal causing the particular electronic device to adjust a transmitter power of a radio used to communicate with the access point.

8. The access point of claim 7, wherein the particular electronic device reduces the transmitter power to reduce interference with other stations connected to one or more additional WLANs.

9. The access point of claim 1, wherein the communications medium comprises a number of channels in a 5 GHz RF spectrum, each channel in the number of channels having a center frequency between 5.170 GHz and 5.835 GHz.

10. The access point of claim 1, wherein each electronic device in the one or more electronic devices is configured to collect the channel information during a period of time subsequent to an end of a first contention-free period and prior to a start of a second contention-free period, wherein the first contention-free period and the second contention-free periods are defined by the access point and associated with a trigger-based access mechanism.

11. An electronic device, comprising:
one or more nodes configured to communicatively couple to an antenna; and
an interface circuit, communicatively coupled to the one or more nodes, configured to communicate with an access point over a channel of a communications medium associated with a wireless local area network (WLAN); and
a processing subsystem, communicatively coupled to the interface circuit, configured to cause the electronic device to:
receive a request from the access point to collect channel information for at least one additional channel associated with the communications medium;
measure a signal metric associated with each additional channel in the at least one additional channel;
populate the signal metric for each additional channel in the at least one additional channel into a data structure to generate the channel information;
select a modulation and coding scheme (MCS) to use to transmit the channel information during an allocated transmission opportunity based on a duration of the transmission opportunity and historical information related to success of failure of previous transmissions; and
transmit the channel information to the access point during the allocated transmission opportunity.

12. The electronic device of claim 11, wherein the processing subsystem is further configured to:
receive information that identifies a new channel in the at least one additional channel; and
configure the interface circuit to communicate with the access point over the new channel.

13. The electronic device of claim 11, wherein the processing subsystem is further configured to:
receive a request from the access point to reduce a transmitter power of the electronic device; and
configure the interface circuit to reduce a power of wireless signals transmitted via the antenna.

14. The electronic device of claim 11, wherein the communications medium comprises a number of channels in a 5 gigahertz (GHz) radio frequency (RF) spectrum, each channel in the number of channels having a center frequency between 5.170 GHz and 5.835 GHz.

15. The electronic device of claim 11, wherein the interface circuit is configured to cause the electronic device to:
receive, from the access point, a trigger frame that includes information specifying an ordered list of electronic devices in a set of electronic devices that are allowed to transmit data via the communications medium during a contention-free period, and
transmit a frame at a temporal position in a sequence of frames based on the ordered list of electronic devices.

16. A method for managing a wireless local area network (WLAN), the method comprising:
via a processing subsystem of an access point:
monitoring a portion of a radio frequency spectrum to detect a power associated with one or more channels associated with the WLAN while the one or more channels are inactive;
selecting an optimum channel within the radio frequency spectrum utilized to communicate with at least one electronic device connected to the WLAN;
configuring an interface circuit of the access point to communicate with the at least one electronic device via the optimum channel;
selecting a second channel in the radio frequency spectrum based, at least in part, on channel information collected by one or more electronic devices connected to WLAN; and
re-configuring the interface circuit of the access point to communicate with the at least one electronic device via the second channel,
wherein:
the access point communicates with the one or more electronic devices via scheduled communication during contention-free periods separated by quiet periods to share the communications medium with other WLANs; and
the one or more electronic devices each select a modulation and coding scheme (MCS) to use to transmit uplink data to the access point during a respective allocated transmission opportunity based on a duration of the transmission opportunity and historical information related to success or failure of previous transmissions.

17. The method of claim 16, the method further comprising:
via the processing subsystem of the access point:
causing a wireless signal to be transmitted to the at least one electronic device via a wireless personal area network (WPAN), wherein the wireless signal causes each electronic device of the at least one electronic device to configure a respective interface circuit of the electronic device to communicate with the access point via the second channel.

18. The method of claim 16, wherein the radio frequency spectrum comprises a number of channels having a center frequency in a range of frequencies between 5.170 gigahertz (GHz) and 5.835 GHz.

19. The method of claim 18, wherein the center frequency of the second channel is in a range between 5.250 GHz to 5.710 GHz.

20. The method of claim 16, wherein the channel information comprises a signal metric measured by a particular electronic device in the one or more electronic devices for each channel in the radio frequency spectrum.

* * * * *